(12) United States Patent
Palen et al.

(10) Patent No.: US 7,298,941 B2
(45) Date of Patent: Nov. 20, 2007

(54) OPTICAL COUPLING TO IC CHIP

(75) Inventors: Edward L. Palen, Redwood City, CA (US); Gregory L. Wojcik, Ben Lomond, CA (US); Lawrence C. West, San Jose, CA (US)

(73) Assignee: Applied Materials, Inc., Santa Claa, CA (US)

( * ) Notice: Subject to any disclaimer, the term of this patent is extended or adjusted under 35 U.S.C. 154(b) by 0 days.

(21) Appl. No.: 11/354,267

(22) Filed: Feb. 14, 2006

(65) Prior Publication Data

US 2006/0239605 A1 Oct. 26, 2006

Related U.S. Application Data

(60) Provisional application No. 60/653,432, filed on Feb. 16, 2005.

(51) Int. Cl.
G02B 6/32 (2006.01)
B29B 11/00 (2006.01)

(52) U.S. Cl. .............................. 385/33; 385/14; 385/93; 385/49; 385/88; 385/92; 385/141; 264/1.1; 264/1.24; 264/1.26

(58) Field of Classification Search .................. 385/49, 385/88, 89, 92, 93, 94, 129, 130, 131, 132, 385/37, 31, 32, 33, 34, 14, 141; 264/1.1, 264/1.24, 1.26, 1.32
See application file for complete search history.

(56) References Cited

U.S. PATENT DOCUMENTS 4,744,617 A * 5/1988 Hvezda et al. ................ 385/24
4,872,739 A * 10/1989 Kahn et al. .................... 385/24
5,087,984 A 2/1992 Heiney et al. ............... 359/282
5,195,150 A * 3/1993 Stegmueller et al. ......... 385/33
5,515,468 A 5/1996 DeAndrea et al. ............ 385/88
5,708,743 A 1/1998 DeAndrea et al. ............ 385/88
6,334,716 B1 * 1/2002 Ojima et al. .................. 385/89
6,925,256 B1 8/2005 Heiney ........................ 398/42
7,043,106 B2 5/2006 West et al. ................... 385/14
7,063,467 B2 * 6/2006 Nagasaka et al. ............. 385/88

(Continued)

OTHER PUBLICATIONS

Heiney et al., Design and Characterization of a Novel Fiber Optic Coupling Device for Data Communication Applications, in proceedings of the IEEE/LEOS Summer Topical Meeting on Hybrid Optoelectronic Integration and Packaging, 1993, pp. 15-16.

(Continued)

Primary Examiner—Brian M. Healy
(74) Attorney, Agent, or Firm—Wilmer Cutler Pickering Hale & Dorr LLP; Eric L. Prahl

(57) ABSTRACT

An optoelectronic circuit including: an IC chip made up of a substrate in which an optical waveguide and a mirror have been fabricated, the substrate having a first lens formed thereon, wherein the mirror is aligned with the optical waveguide and the first lens is aligned with the mirror to form an optical path connecting the first lens, the mirror, and the optical waveguide; and an optical coupler including a second lens, the optical coupler affixed to the substrate and positioned to align the second lens with the first lens so as to couple an optical signal into or out of the optical waveguide within the IC chip.

53 Claims, 17 Drawing Sheets

U.S. PATENT DOCUMENTS

| | | |
|---|---|---|
| 2004/0013338 A1 | 1/2004 | Bjorkman et al. ............ 385/14 |
| 2004/0234210 A1* | 11/2004 | Nagasaka et al. ............. 385/88 |
| 2005/0053347 A1 | 3/2005 | West et al. ................. 385/129 |
| 2005/0213981 A1 | 9/2005 | Heiney ........................ 398/85 |

OTHER PUBLICATIONS

Heiney et al., Design and Characterization of a Novel Fiber Optic Coupling Device for Data Communication Applications, AMP Incorporated, undated, pp. 1-11.

Heiney et al., Polymer Molded Lenses for Optoelectronics, IEEE, 1995, pp. 170-176.

Jiang et al., LED Based Parallel Optical Links, OPMR1.2, undated, pp. 224-225.

Liu et al., A high-speed silicon optical modulator based on a metal-oxide-semiconductor capacitor, Nature, 2004, pp. 615-618.

Singer (Ed.), Optical waveguides integrated with sea-of-leads WLP, Semiconductor International, 2002. Retrieved Aug. 4, 2004 from http://www.reed-electronics.com/semiconductor/index.asp?layout=articlePrint&articleID=CA235148.

* cited by examiner

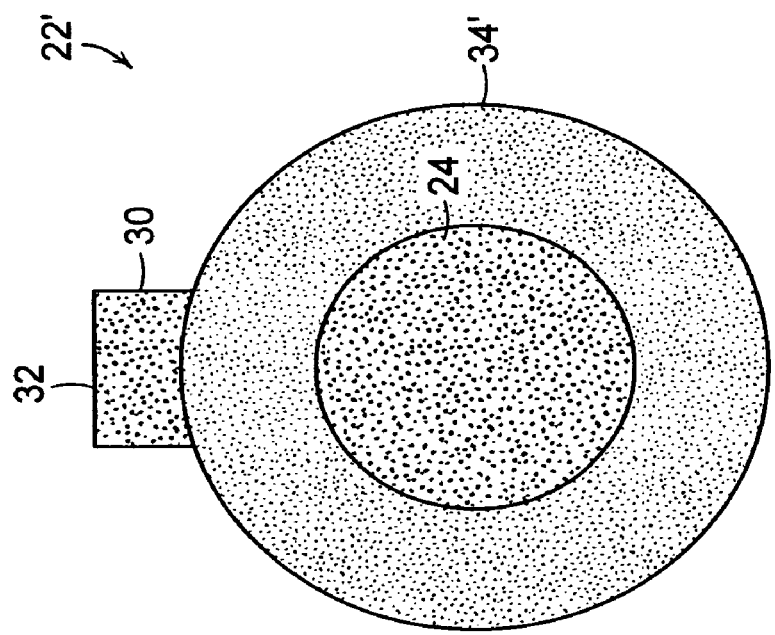
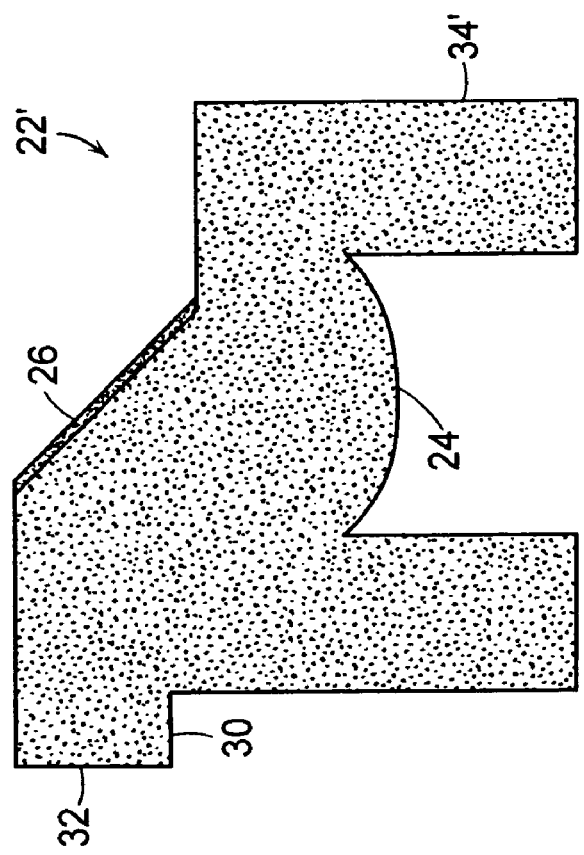
FIG. 4A
FIG. 4B

OPTICAL COUPLING TO IC CHIP

This application also claims the benefit of U.S. Provisional Application No. 60/653,432, filed Feb. 16, 2005, incorporated herein by reference.

TECHNICAL FIELD

This invention relates generally to the coupling of optical signals into and out of an IC chip.

BACKGROUND OF THE INVENTION

Semiconductor fabrication technology is moving towards figuring out ways to combine both electrical signaling and optical signaling on the same IC chips. This drive to combine of the two technologies is in part fueled by the inherent advantages associated with optical signals in comparison to electrical signals both in terms of distributing information throughout a given IC chip and in terms of inter-chip communications. One application that is likely to be among early commercial implementations involves the use of optical signals to distribute clock signals throughout a very large IC chip, such as a microprocessor. This is because optical signals are typically characterized by smaller skews and they are less susceptible to jitter and other signal distortions to which electrical signals tend to be prone especially at the nanometer scales now being considered for IC chip design.

Getting the optical signals into and out of the IC chips in a way that is commercially practical and involves fabrication costs that are competitive presents one of the challenges the industry faces today. The embodiments described herein represent some answers to this challenge.

SUMMARY OF THE INVENTION

In general, in one aspect the invention features an optoelectronic circuit including: an IC chip comprising a substrate in which an optical waveguide and a mirror have been fabricated, the substrate having a first lens formed thereon, wherein the mirror is aligned with the optical waveguide and the first lens is aligned with the mirror to form an optical path connecting the first lens, the mirror, and the optical waveguide; and an optical coupler including a second lens, the optical coupler affixed to the substrate and positioned to align the second lens with the first lens so as to couple an optical signal into or out of the optical waveguide within the IC chip.

Other embodiments include one or more of the following features. The substrate also includes microelectronic circuitry fabricated therein. The optical coupler is made of a material that is transparent to the wavelengths of the optical signal. The second lens is an integrally formed part of the optical coupler. The microelectronic circuitry is fabricated in a first layer in the substrate and the optical waveguide and the mirror are fabricated in a second layer within the substrate that is below the first layer. The substrate has a backside and the first lens is formed on the backside of the substrate. The optical coupler is affixed to either the backside or the front side of the substrate. Alternatively, the first lens is formed on the front side of the substrate. In which case, the IC chip further includes a reflecting area formed on the backside of the substrate and the first lens, the reflecting area, and the mirror in the optical waveguide are aligned along the optical path with the reflecting surface between the first lens and the mirror. The optoelectronic circuit also includes an optical fiber connected to the optical coupler, wherein the optical coupler, the first lens on the backside of the substrate and the mirror in combination optically couples the optical fiber and the optical waveguide.

Some of the other embodiments also include one or more of the following features. The first and second lenses define an optical axis, wherein the optical coupler includes a mirror and a coupling surface against which the optical fiber is abutted, and wherein the optical fiber is aligned transversely to the optical axis. The coupler includes an angled surface and a metal film deposited on the angled surface to form the mirror in the optical coupler. The optical coupler includes a mounting structure. The mounting structure includes a tube-shaped extension which surrounds and extends away from the second lens in the optical coupler and defines at its distal end a flat surface which rests against the backside of the IC chip. The optical coupler including the integrally formed first lens is made of a glass (e.g. molded glass) or is made of a molded plastic. The optoelectronic circuit also includes an epoxy or a metallization bonding the optical coupler to the substrate. The substrate is made of silicon. The substrate further includes a pedestal extending away from the backside with the first lens formed on a distal end of the pedestal. The optoelectronic circuit further includes a chip carrier with the IC chip flip-chip mounted on the chip carrier and/or an AR film deposited on the second lens in the optical coupler. The optoelectronic circuit also includes an AR film deposited on the first lens.

Some of the other embodiments also include one or more of the following features. The optical coupler includes a cylindrically-shaped extension with the coupling surface at one end of the cylindrically-shaped extension. The optical fiber is fusion spliced onto the coupling surface. The first lens is formed by etching the substrate. The mirror is oriented at an angle of about 45° relative to the optical axis. The first lens is a focusing lens which is positioned to focus a received collimated beam into the optical waveguide. The second lens is a collimating lens which collimates a received beam and delivers the collimated beam to the first lens. The optical coupler includes an integrated light source. The light source includes a laser which generates the optical signal, a turning mirror which redirects the optical signal from the laser into the second lens. Alternatively, the optoelectronic circuit includes a light source mounted on the optical coupler, wherein during operation the light source generates the optical signal.

In general, in another aspect, the invention features an optoelectronic circuit including: an IC chip comprising a substrate in which an array of optical waveguides and an array of mirrors have been fabricated, the substrate having a first lens system formed thereon, wherein each mirror of the array of mirrors is aligned with a corresponding different optical waveguide of the array of optical waveguides and the first lens system is aligned with the array of mirrors to form an array of optical paths connecting the first lens system, the array of mirrors, and the array of optical waveguides; and an optical coupler including a second lens system, the optical coupler affixed to the substrate and positioned to align the second lens system with the first lens system so as to couple optical signals into or out of the array of optical waveguides within the IC chip.

Other embodiments include one or more of the following features. The first lens system is a first array of lens elements and the second lens system is a second array of lens elements. Each lens element of the first array of lens elements is aligned with a corresponding different lens element of the second array of lens elements. The second array of lens elements is an integrally formed part of the optical coupler. The substrate has a backside and the first array of lens elements is formed on the backside of the substrate. The optical coupler is affixed to the backside of the substrate.

The optical coupling configurations described herein includes optical elements that are both external to the IC structure and integral to the IC structure. They provide optical coupling from the light source or optical fiber to the IC waveguide. Likewise, the same optical coupling configurations provide optical coupling from an IC waveguide to an external waveguide or optical waveguide of a different IC. The optical coupling configuration, which includes a fiber pigtailed collimating lens mount structure subassembly, also referred to as a "Surface Mount Optical Coupler" or "SMOC", can be fabricated so that it is very low cost, is scaleable for high volume optical coupling to IC manufacturing, and is compatible with the optical design for coupling to IC waveguides that have the IC coupling optics described in this disclosure.

Some of the concepts described herein enable one to design the optical coupling alignment and attachment processing to be compatible with electronics industry automated assembly processing equipment of surface mount assembly using Flip-Chip automated assembly equipment. Also certain embodiments of the SMOC make it possible that many variances in optical coupling of the subassemblies can be greatly compensated solely by lateral displacement of the SMOC relative to the IC backside lens. This compensation requires that the beam not be perfectly collimated at the output of the SMOC so that other errors in beam tilt and position at image locations of the fiber and waveguide can be compensated by lateral movement of the SMOC. The less collimated the beam, the less movement is required by the SMOC to compensate for lateral tilt and position errors in other elements of the optical system. So a careful analysis needs to be made to determine the best non-collimation or beam divergence/convergence that fits the desired tolerances on the system. In that case, the SMOC design and assembly processing methods ensure that no tilt of the SMOC relative to the IC optics can occur to degrade the optical coupling. These advances, which are described herein, when combined together enable a low-cost, high volume production solution for optical coupling to ICs.

Using two lenses with one on the coupler and the other on the IC allows for larger placement tolerance between the collimated, or pseudo-collimated, light beams in between the "focusing lens" into the IC waveguide and the "collimating lens" from the optical fiber due to larger beam diameter. Optical coupling alignment tolerances on the order of 20 μm for 400 μm beam diameters and 5 μm for 100 μm beams can be expected. In addition, integrating the focusing lens into the IC by wafer level fabrication reduces the Bill of Materials (BOM) and assembly align & attach costs of this lens.

Choosing a small diameter for the collimated beam allows for both a shorter optical train length and smaller footprint area on the IC backside heat sink. This is also beneficial from an optics perspective due to the closer proximity of the focusing lens to the IC waveguide (partly due to IC wafer thinning factors), resulting in a smaller than normal (400-800 μm for traditional optoelectronic devices) collimated beam diameter.

At least some of the embodiments disclosed herein provide a means for optically coupling to optical waveguides within integrated chips that has low cost fabrication of components and has assemblies that are compatible with high volume production assembly. The theoretical optical coupling efficiency is 96% for some of these systems. Various disclosed design features allow for this high optical coupling efficiency to be realized in a production environment.

The optical coupling of at least some of the disclosed systems is achieved without resulting sensitivity to either the polarization state of the light or the wavelength of the light. Thus, polarization dependent loss (PDL) and polarization mode dispersion (PMD) are not limiting factors for at least some of the described optical coupling systems. Also, the performance of at least some of the disclosed optical coupling systems is not sensitive to the specific wavelengths used in any wavelength division multiplexing (WDM) configuration for optical communication.

It should be noted that competing optical coupling configurations for out-of-plane coupling to planar waveguides that are based upon diffraction grating or photonics crystal coupling schemes are very sensitive to the polarization state and the wavelength of light. This polarization state and wavelength dependence of optical coupling marginalize the performance of such competing optical coupling systems.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIGS. 4A and 4B shows a side and bottom view, respectively, of a schematic representation of a SMOC.

DETAILED DESCRIPTION

Structure:

Embodiments are described herein that represent various structures for coupling optical signals to optical waveguides that have been fabricated on or in an IC chip. In general, in these embodiments the optical coupling to the IC waveguide is accomplished by directing a beam (which may be a diverging beam, a converging beam or a collimated beam) to a Si lens fabricated on and integral to the backside of the IC chip (i.e., silicon substrate). In at least some of the described embodiments, the beam will be a substantially collimated beam. The Si lens then focuses the light beam into the IC waveguide via a 45° mirror located at the IC waveguide. The collimated light beam between the external optics and the IC optics passes through dry air. The collimating lens and the Si focusing lens both have anti-reflection (AR) coatings to keep the optical coupling losses low.

Figure 1:
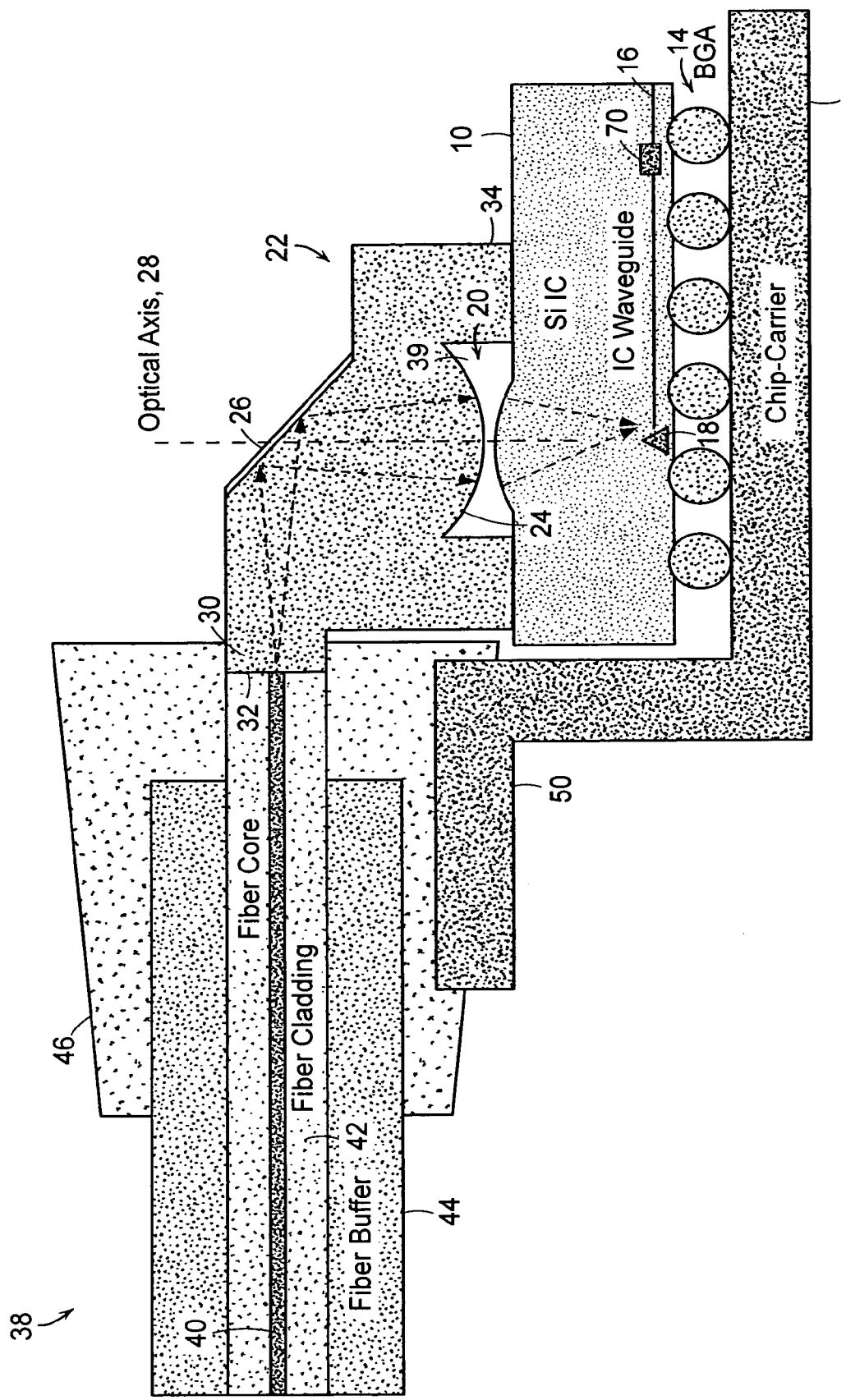
FIG. 1 is a schematic representation of one embodiment of a SMOC mounted on the backside of an IC chip.

One embodiment is illustrated in FIG. 1. It shows an IC chip 10 that is flip-chip mounted onto a chip carrier 12 by means of a ball grid array (BGA) 14. Using known techniques, such as those described in U.S. Ser. No. 10/280,492 entitled "Optical Ready Wafers," an optical waveguide 16 has been fabricated on the front side of the chip. Waveguide 16 is either fabricated in a layer within the chip that is at the same level as other microelectronic (e.g. CMOS) circuitry (not shown) that is also fabricated on the front side of the chip or it is in a layer that is buried beneath the level in which the microelectronic circuitry resides. Optical waveguide 16 represents an optical signal distribution network that serves to distribute optical clock signals or other optical signals to and/or from the microelectronic circuitry. For the sake of simplicity, this optical signal distribution network is shown as a single optical waveguide but in reality it is likely to be a complex arrangement of optical waveguides that distributes the optical signals. At one end of optical waveguide 16 there is a mirror 18 fabricated within the waveguide. Mirror 18 serves either to redirect an optical signal coming through the backside of the chip into the waveguide or to redirect optical signals from the optical waveguide out of the backside of the chip. On the backside of chip 10 there is a focusing lens 20 that has been fabricated as an integral part of the chip. Lens 20 is aligned with mirror 18.

Affixed to the backside of chip 10 and in alignment with lens 20 is a collimating lens subassembly or surface mount optical coupler (SMOC) 22. It is an integrally fabricating structure that includes: a collimating lens 24; a mirrored surface 26 angled 45° relative to the optical axis 28 of collimating lens 24; a short, rod-shaped extension 30 which has a flat optical surface 32 at its exposed end, and a cylindrically-shaped support or tube extension 34 which supports and aligns the subassembly against the backside of chip 10. Butted against flat surface of extension 30 is an optical fiber pigtail 38 that characteristically includes a fiber core 40, surrounded by fiber cladding 42 which is, in turn, surrounded by a fiber buffer layer 44 that protects the inner structure. A polymer boot 46 surrounds the end of optical fiber pigtail 38 and part of extension 30 and serves both to provide a means of anchoring the assembly to an extension arm 50 of chip carrier 12 and to protect the optical fiber from being damaged during handing. Polymer boot 46 is secured to the sidewall of the chip-carrier by low modulus adhesive. When lens subassembly 22 is mounted on the backside of chip 10, it aligns its collimating lens 24 with focusing lens 20 and maintains them at a predetermined distance from each other with an intermediate air gap 39 separating them. The footprint of the collimating lens assembly on the IC backside can be kept as small as 0.5 to 1.0 mm in diameter, which is small enough to produce an acceptably small impact on the IC heat sink cooling and local thermal control requirements.

In the described embodiment, the wall of tube extension 34 is thick enough (e.g. 150 µm or larger) to provide adequate mechanical stability to hold the optical train securely. The lens subassembly mount surface is the flat end of tube 34. It is an annular shaped surface that abuts against the backside of IC chip 10 and is concentrically aligned with and surrounds Si lens 20 on the IC backside. Design clearances between the inside wall of tube extension 34 and the outer perimeter of Si lens 20 allow for optimal optical coupling alignment. The tube extension's flat end, mounting surface accommodates either epoxy bonding to the IC backside or metal bonding, if the two surfaces are metallized. The lens subassembly mount footprint area on the IC backside is small by the nature of the optical design.

A diverging light beam from optical fiber pigtail 38 enters collimating subassembly 22 through optical surface 32 of extension 30 and contacts angle mirrored surface 26 which redirects the beam downwards towards collimating lens 24. Collimated light (or substantially collimated light) from lens 24 passes through air gap 39 and into focusing lens 20 which focuses the collimated beam into optical waveguide 16 via mirror 18. Mirror 18 redirects the focused beam into optical waveguide 16.

In other words, the modulated light signal from optical fiber pigtail 38 enters the IC coupling optics (i.e., lens 20) as a collimated beam. The size of this collimated light beam is chosen such that its placement tolerances relative to the IC optics are within the placement tolerances of available standard electronics automated assembly equipment such as Flip-Chip. For example, a collimated beam diameter of 100 µm translates into placement tolerances of 5 µm to 10 µm for high optical coupling to the IC waveguide. The collimated beam is also chosen to be small so to minimize the impact on the IC heat sink.

Because the coupling beam (i.e., the beam that passes from collimating lens 24 to focusing lens 20 is collimated, the optical coupling is not sensitive to the z-axis alignment (perpendicular to the IC back-side) of the lens subassembly. So, only a minimal mechanical clearance distance between the top of Si lens 20 on the IC backside and the surface of collimating lens 24 is necessary. In addition, redirecting the light beam 90° in the collimating lens mount structure, as shown in FIG. 1, also reduces the clearance height that is required above the IC backside for the optical fiber pigtail. In the described embodiment, the total height of the lens subassembly above the IC backside is less than 2 mm.

Of course, if the beam that is generated by lens 24 is not truly collimated, as might be desirable under some circumstances, then there will be some sensitivity to the z-axis alignment of the lens. And if the redirecting mirror 26 is not used but rather the light beam from optical fiber is directed straight down into collimating lens 24 by orienting fiber pigtail 38 vertically, then a clearance height of greater than 20 mm would be required to accommodate the optical fiber's minimum bend radius.

The mounting structure for these optical elements to the IC is configured as one integrated assembly to reduce subassembly BOM cost and assembly cost. The bond between the lens subassembly tube mount wall and the IC backside provides a seal of the exposed optical surfaces of Si lens 20 and collimating lens 24, protecting them from environmental contamination (such as dust, moisture, condensable species, heat sink thermal grease, etc.) that could degrade the optical coupling. If the mount structure is molded glass, the attachment method to the IC can be a metallic bond, which would produce an environmental seal of the collimated light path that is also a hermetic seal. However, alternative bonding methods can be used and might be preferable. For example, one could use an epoxy, which avoids the higher costs associated with metallization processing and it avoids the risk of breaking the IC as a result of the bending stress arising from metallic bonding to a thinned, fragile IC wafer. Those stresses are caused by the high modulus of metal joints and by the differential contraction of the metal relative to the silicon of the IC wafer from metal melt temperatures.

In the described embodiment, collimating lens subassembly 22, including lens 24 and mounting tube 34, is made of glass. Glass has a number of desirable characteristics. It has good optical transmission; it is dimensionally stabile; fusion splicing can be used to attach the optical fiber pigtail; it can receive an AR coating on the lens surface; and metallization can be used on the mounting surfaces if metal bonding to the IC back-side is desired. In addition, the differences in thermal expansions between the IC substrate and collimating lens mount structure (e.g. coefficient of thermal expansion (CTE) for borosilicate glass is about 3.2 ppm/° C. and for silicon CTE is 2.6-3.3 ppm/° C.) can be accommodated by standard bonding processes of electronic assembly and optoelectronic assembly processing.

Collimating lens subassembly 22 is fabricated by using a molding process to produce the shape shown more clearly in FIGS. 4A and B. Molding glass lenses is a common fabrication method, is capable of achieving the optical coupling tolerances of this embodiment, and is scaleable to achieve the low cost requirements of high volume manufacturing.

Optical fiber pigtail 38 is attached to the molded-glass collimating lens and mount assembly by fusion splice processing. Fusion splice processing is a common fiber optics processing method that is inexpensive, achieves very low optical coupling losses (typically around 0.03 dB insertion loss for SMF (Single Mode Fiber) to SMF splicing), and can be integrated with automated assembly processing. In the described embodiment, the collimating lens mount structure attachment interface with the pigtail (i.e., rod extension 30) is of the same diameter as the outer diameter of the cladding of the fiber in the pigtail and it protrudes sideways a sufficient distance from the mount structure to allow the fusion arc heat to access the fusion interface. A standard SMF cladding outer diameter is 125 µm, which determines the fusion surface diameter shown in FIGS. 4A-B (i.e., the diameter of flat optical surface 32).

An alternative material other than glass, such as such as a plastic or polymer, may be used for the collimating lens and mount structure. Plastics have an advantage in that they are more easily and less expensively molded into the desired shape.

Figure 5A:
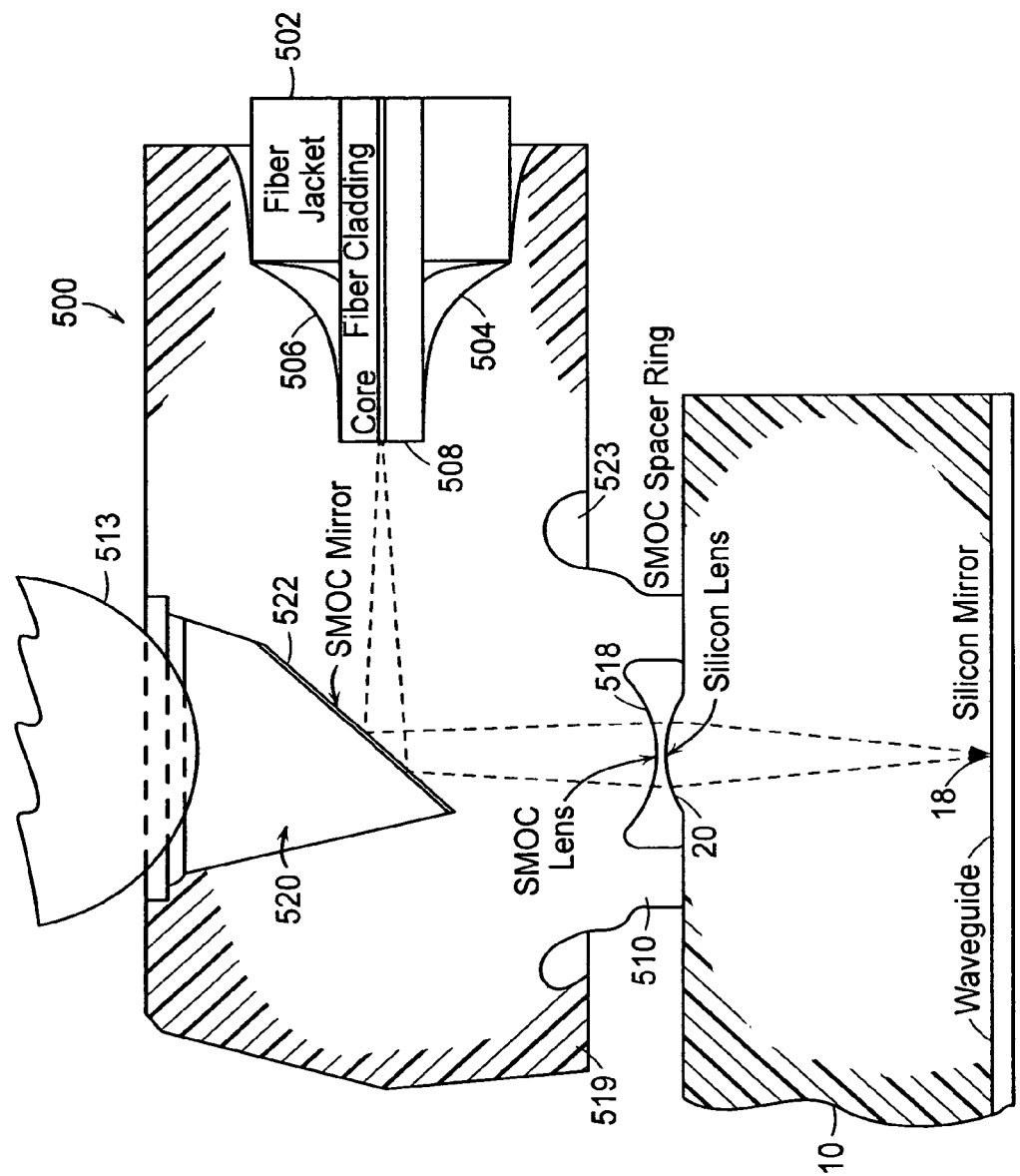
FIG. 5A is a cross-sectional view of a plastic SMOC aligned to an IC lens and IC waveguide and attached to IC backside by epoxy.
Figure 5C:
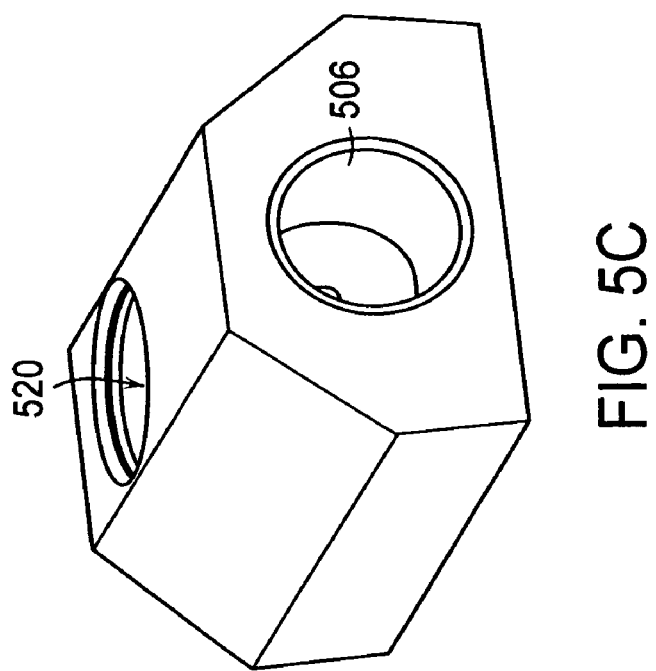
FIGS. 5B and 5C show two perspective views of the plastic SMOC depicted in FIG. 5A.
Figure 5B:
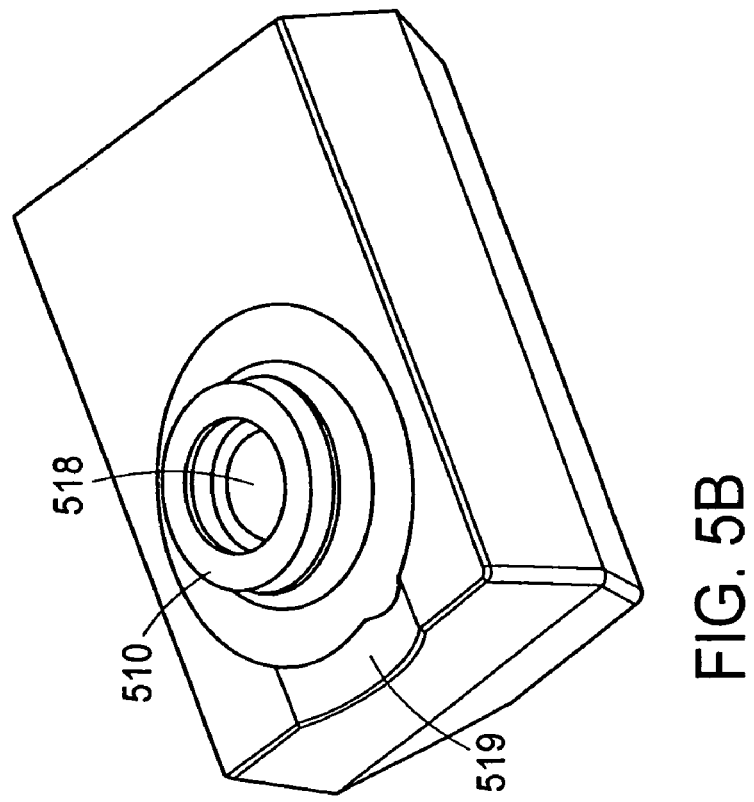

FIGS. 5A-C show a pigtailed plastic SMOC 500 aligned to the IC backside lens. SMOC 500 is more optimized for being fabricated by injection micromolding of plastic. Of these figures, FIG. 5A shows a cross-sectional view of SMOC 500 illustrating the optical coupling path aligned with focusing lens 20 on the backside of chip 10. SMOC 500 includes a collimating lens 518 that is surrounded by a hard stop cylinder (or spacer ring) 510. Aligned with lens 518 and extending into the body of SMOC 500 from the opposite side of SMOC 500 is an insert-formed cavity 520 with an angled bottom (45°) that is coated with a reflective material (e.g. Au or other metal) to form a mirror 522. Another insert cavity (i.e., fiber insert cavity 506) is formed in a sidewall of SMOC 500 so that it is aligned with lens 20 via mirror 522. An optical fiber 502 is secured within fiber insert cavity 506. An optical signal from optical fiber 502 reflects off mirror 522, passes through collimating lens 518 and into the backside of IC chip 10 through focusing lens 20. (Of course, an optical signal can also travel in the opposite direction, if appropriate.)

The plastic material of which SMOC 500 is made may be a polycarbonate, a polyetherimide (PEI) such as Ultem®, or other injection moldable plastic or a thermal set plastic. These materials are compatible with: thin film evaporation and sputtering processing to apply anti-reflection (AR) coatings on the SMOC lens surface; thin film evaporation; sputtering and electroplating processing for metallization on the SMOC turning mirror to protect the mirror's total internal reflection (TIR) degradation from environmental contamination such as dust particles and thermal grease; and metallization on the SMOC for metal bonding to the IC surface. Adhesion of these coatings to the plastic SMOC over application environmental exposures is assured with normal process controls.

Plastic SMOC 500 incorporates substantial improvements over state of the art methods for optical coupling to single mode fiber (SMF) 502. Alignment of the SMF core, typically 9 µm in diameter, to the optical axis of the SMOC lens to 0.1 µm to 2 µm precision in lateral and depth axes is achieved by passive insertion into the SMOC fiber insert cavity 506. In this process, a controlled volume of index matching epoxy 504 with UV cure and secondary thermal cure is injected into SMOC fiber insert cavity 506 from a dispensing syringe. Typical SMF, having a 125 µm cladding diameter, is stripped of its protective buffer outer coating of jacket and cleaved to a preset protrusion of fiberglass cladding from the jacket. Particles and debris are removed from the cleave fiber tip by ultrasonic solvent cleaning prior to insertion into the SMOC. The fiber tip is inserted into SMOC tapered fiber insert cavity 506 until the fiber tip contacts a hard-stop end 508 of fiber insert cavity 506. As the fiber tip moves into tapered fiber insert cavity 506 of SMOC 500, the index matching epoxy 504 flows around the side of the fiber cladding to allow the fiber tip to pass completely to hard stop end 508 of fiber insert cavity 506. The hard stop end 508 and the fiber tip may be angled slightly, e.g. at 8°, to minimize optical back reflection in the optical system. Index matching epoxy 504 is cured to secure the fiber cladding, fiber buffer, and protective fiber boot (not shown) to the plastic SMOC to form a fiber pigtailed SMOC. The fiber insertion process is designed to be a passive alignment process without the need for optical testing of the assembled pigtailed SMOC or any means of active feedback to achieve the fiber's optical alignment.

It is possible to achieve these micrometer and sub-micrometer tolerances because of the precision tapered fiber insert cavity fit of the plastic SMOC and the method of fabrication to hold the fiber insert cavity tolerances. This is accomplished by using a precision diamond turned insert in the injection mold die to form the tapered fiber insert cavity. Fiber insert diameter tolerances of 1 μm to 2 μm are achievable by using this method; whereas, state of the art injection molding can, at best, hold 5 μm to 10 μm tolerances for ideal geometries. Precision alignment of the fiber is achieved by a three-point contact of the wall of the SMOC fiber insert cavity to the fiber cladding outside diameter. This three-point contact and gap for epoxy flow past the fiber cladding during the fiber insertion process is made by a "tri-lobal" shape fabricated by diamond turning. The minor axis of this tri-lobal shape may be slightly larger or slightly smaller than the fiber cladding outside diameter depending upon the amount of plastic compressive fit desired, and the major axis is approximately 155 μm in diameter to allow a 30 μm gap for epoxy flow along the fiber cladding. This SMOC fiber coupling method can make possible a reduction in device coupling costs by at least one order of magnitude over industry state of the art methods.

To achieve no tilt insertion, one should provide a length of the trilobal shaped region that is long enough to ensure that the optical fiber core is aligned to the SMOC optical axis and not tilted (e.g. a length of 100 μm provides for no tilt insertion of fiber into the SMOC). Also, if the throat for the fiber insert cavity is sufficiently wide, one can completely enclose the fiber's protection buffer layer. This will protect the glass fiber from breakage due to bending and the attachment insert of the SMOC. For example, a fiber insert cavity throat diameter of 446 μm will readily accommodate a standard optical fiber with 245 μm buffer diameter. In addition, by tapering the fiber insert cavity from the throat to the trilobal precision non-tilt length, the fiber will not snag or be prevented from being passively aligned the SMOC optical axes during fiber insertion.

Optimal optical coupling of SMOC 500 to the IC waveguide is possible by incorporating a precision bonding hard-stop cylinder (or spacer ring) 510 around SMOC lens 518. This hard-stop cylinder 510 not only acts as protective barrier to the light beam's optical path between SMOC lens 518 and Si lens 20 on IC chip 10 but it also eliminates SMOC-to-IC assembly tilt. SMOC bonding hard-stop 510 is fabricated to hold flatness to a tolerance of 1 μm over the cylinder end of 550 μm. This flatness is possible due to the use of precision diamond turning processing to fabricate the lens and hard-stop insert in the injection mold die.

The embodiment shown in FIG. 5 is optimized for epoxy attachment to the IC backside. Prior to alignment to the IC backside lens, the epoxy may be applied in controlled volume and controlled location, around the lens hard-stop 510 with no adhesive inside the hard-stop. This has the advantage of not consuming cycle time of the expensive Flip-Chip automated assembly station. Application methods may be by syringe dispensing, beta-stage adhesive perform, ink-jet type dispensing, or otherwise. If using use ink-jet dispensing technology, the ink-jet dispensing process is modified for the epoxy attachment choice. Modifications may include use of additive agents such as solvent for ink-jet dispensing performance, typically such additives would evaporate prior to epoxy UV cure.

Alternatively, the bonding adhesive may be applied after SMOC 500 is aligned to IC lens 20, as shown in the configuration of FIG. 5A. In this configuration, SMOC 500 is aligned "dry" to IC lens 20, it is pressed flat against the backside of IC chip 10 to eliminate tilt in the optical coupling between SMOC 500 and the optical waveguide. Adhesive is dispensed from a syringe at recess opening 519 to wick into the gap volume between the SMOC bottom and IC backside around the hard-stop cylinder 510. As SMOC 500 is pressed against the IC backside, no adhesive is able to wick underneath the SMOC hard-stop and obscure the light beam path between the SMOC lens and IC lens. Adhesives with fast wicking capability are chosen for fast adhesive dispensing.

In the case of dispensing epoxy after the pigtailed SMOC has been aligned to the IC back-side, dispense time is important as it adds to cycle time on the expensive Flip-Chip automated assembly station. Techniques for enabling fast epoxy dispensing in a symmetric repeatable volume include: providing an injection flow port 519 (see FIG. 5A) at the end of the SMOC underside; providing a circular inverted moat 523 around the hard-stop for the epoxy to fill by capillary flow; providing curved surfaces at the interface of the SMOC hard-stop and inverted circular moot to encourage fast capillary flow; using a micro-syringe positioned close to the SMOC side injection port to deliver a repeatable epoxy volume into the injection port; using a low viscosity epoxy; and ensuring that the SMOC has been pressed flat to the IC back-side using the ball press method thereby ensuring that no epoxy will flow underneath the hard-stop nor onto the SMOC lens.

The shape around the SMOC hard-stop spacer ring shown in FIG. 5A is optimized for adhesive capillary action to wet the SMOC hard stop completely, quickly and symmetrically. This adhesive is then bonded in place using high brightness ultraviolet (UV) radiation directed into the gap between the SMOC and IC backside whilst the SMOC is firmly held in its optimal alignment position. Upon completing a "snap" cure of the epoxy, the epoxy holds the optical coupling alignment, the holding pressure on the SMOC is released and the optically coupled IC/SMOC assembly is removed from the automated assembly station. A secondary thermal cure of the bonding adhesive is made to cure epoxy shaded from UV light and to increase adhesive strength.

Fast SMOC to IC bonding times are critical to meeting the low cost requirements of optical coupling to IC applications due to the high amortization rate of the Flip-Chip automated assembly equipment. The adhesive bonding configuration shown in FIG. 5A is optimized for fast "snap" of epoxy by high brightness UV exposure, thin adhesive cross-sections and minimized shadowed adhesive. Adhesive cure times as fast as 5 to 10 seconds can be achieved in this configuration.

A key feature in achieving repeatable optical coupling to IC in a surface mount assembly environment is cavity 520 in SMOC 500 above 45° turning mirror 522. This insert cavity is centered on the SMOC lens axis and centered on the SMOC hard-stop spacer ring. The Flip-Chip actuator arm is fitted at its end with an appropriately sized metal sphere or ball 513 to press on the SMOC mirror insert during the SMOC to IC align and attachment processing. Machine vision of the Flip-Chip automated assembly station is able to position this metal sphere to within 10 μm of the SMOC lens optical axis. Pressure of this metal ball on the circular mirror insert on the top of the SMOC seats the SMOC onto the IC backside plane with no tilt in the optical coupling by pressing the SMOC hard-stop spacer ring firmly against the IC backside. The IC backside plane will vary from assembly to assembly due to different chip carrier dimensions relative to optical coupling tolerance and due to chip warpage from ball grid array solder bonding to the chip carrier.

Figure 15:
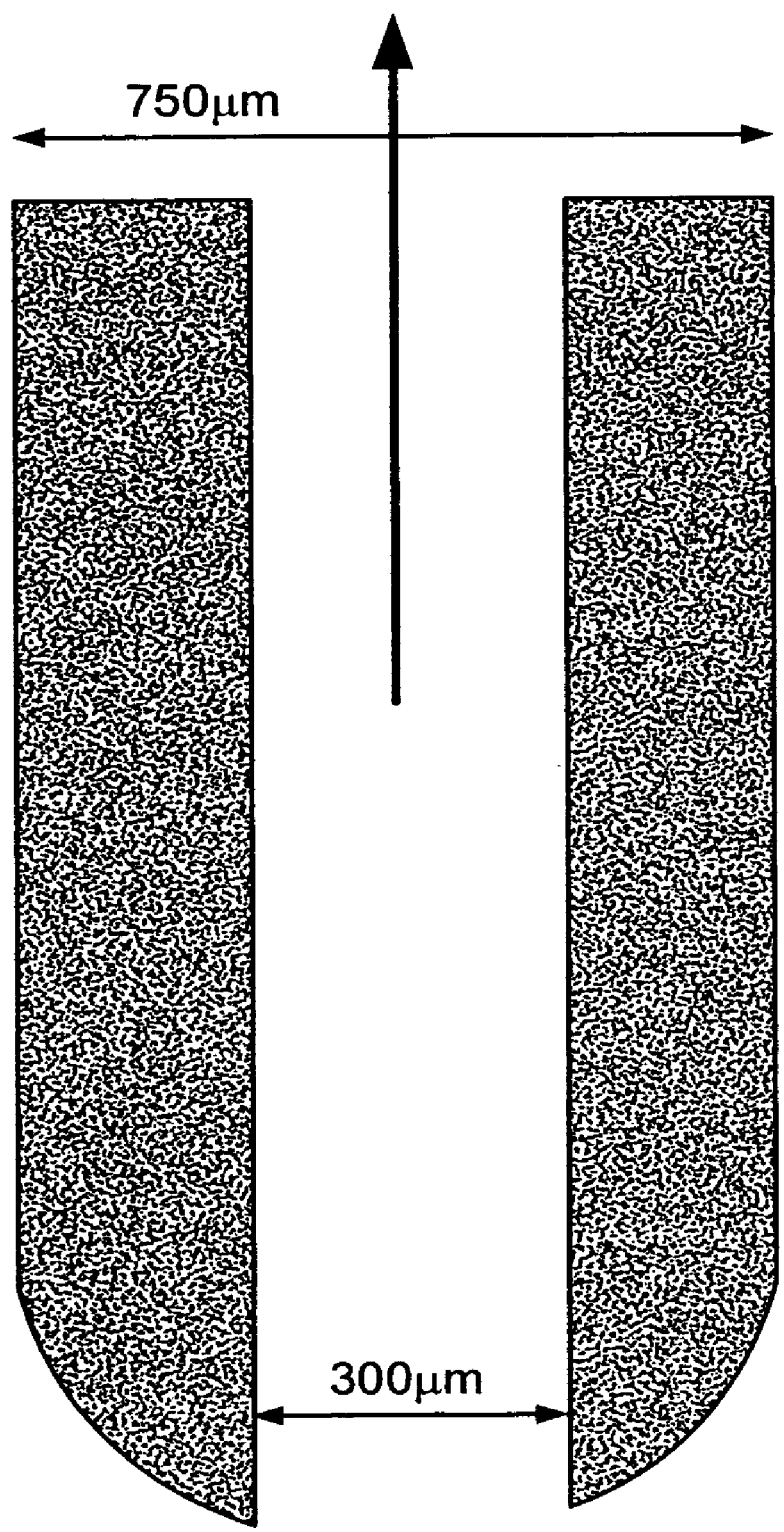
FIG. 15 depicts a vacuum pick and place tool head with a ball end actuator for pressing the SMOC flat onto the backside of the IC for align and attach processing.

It is desirable to incorporate a vacuum pick-up tool with the ball press tool so that only one actuator tool head needs be used in assembly align and attachment processing. The use of one actuator tool head instead of two results in fast assembly process cycle time. A ball press tool head incorporating vacuum pick-up is shown in FIG. 15. It includes a rounded distal working end in the shape of the ball and through its middle is a passage for applying a vacuum (represented by upward directed arrow) to pickup the SMOC and holding it while orienting it and pressing it against the backside of the IC wafer.

The shape of the plastic SMOC shown in FIG. 5A can be optimized for injection mold processing by appropriately designing side draft angles, ejector pin and ejector slide locations, injection gating location and side volume overflow gating. The shape of the plastic SMOC is designed to be as symmetric as possible to minimize plastic warpage from mold cool down and to maintain dimensional stability over bonding to IC processing, thermal cycling, moisture exposure, and other environmental exposures.

The injection molding stem can be used as holding tooling for the fiber insertion process. Because the SMOC is so small, complex tool fixturing would be necessary to orient SMOC relative to the fiber tip for correct insertion to the passively aligned tight tolerances in x, y and z axis. Using the much larger injected molding stem, attached to the SMOC at the injection gate, the SMOC and fiber tip may be held, aligned and pressed firmly together, either manually or by pick and place automated equipment.

Figure 6:
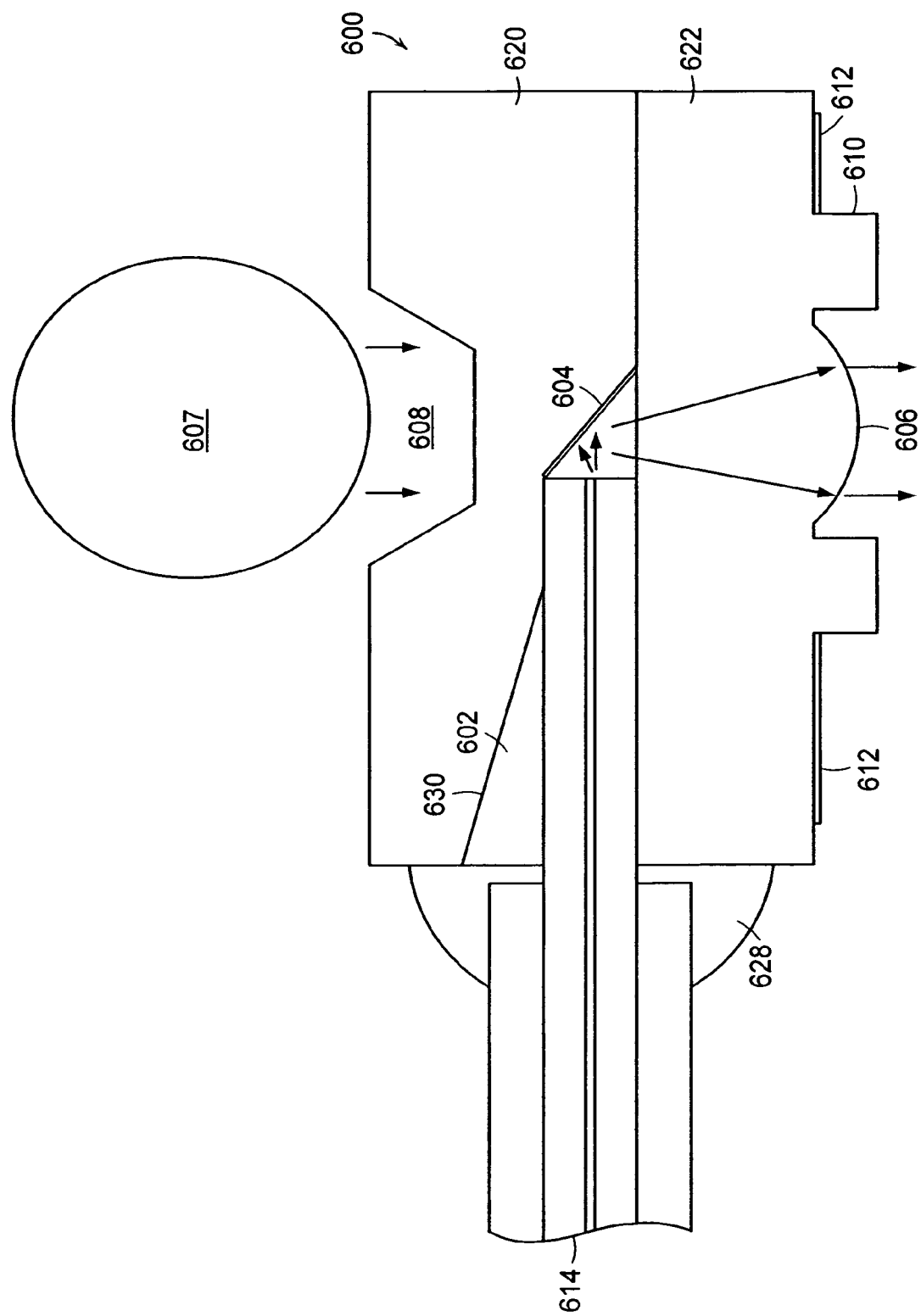
FIG. 6 is a SMOC fabricated in silicon by silicon-micromachining processing.

FIG. 6 shows an embodiment of a SMOC 600 fabricated by silicon micromachining. This silicon SMOC has the same functional features as the plastic SMOC including: a collimating lens 606 (with AR coating); a precision flat hard stop spacer ring 610 around lens 606; a precision tapered fiber insert cavity 602 for passively aligning a fiber core 614 to the axis of collimating lens 606; a 45° turning mirror 604; and a precision pocket 608 on the top of SMOC 600 and centered on the optical axis of lens 606 to receive the Flip-Chip actuator arm's metal ball 607 to press the SMOC flat onto the IC backside. FIG. 6 also shows a SMOC to IC metal bonding configuration with solder pads 612 on the underside of SMOC 600 and outside of hard stop spacer ring 610. SMOC 600 is made up of a top wafer 620 which has a tapered fiber insert V-groove 630 etched into it, bonded to the flat upper surface of a bottom wafer 622. Epoxy 628 holds the fiber in cavity 602. The steps for fabricating this structure are presented in greater detail below.

Metal bonding of the SMOC to the IC is possible with the configuration shown in FIG. 6 and requires solder and a fast local heat source. Solder may be applied in controlled volume and location by solder pre-form positioning, by solder paste dispensing or screen patterning, by solder thin film deposition, or by solder electroplating. Rapid localized heating of the solder may be by electrical resistive heating such of thick film or thin film resistor elements or resistor elements patterned on either the silicon micromachined SMOC underside or on the IC backside. In this case, electrical probe contacts need to be made to these resistive heating elements during the SMOC to IC attachment processing. The contact heating methods of focused infrared laser beams and inductive radio frequency (RF) heating of metallization are not options due to potential damage of IC transistors and IC circuit traces.

The fabrication of silicon SMOC 600 shown in FIG. 6 involves of the following process:
1) Cut top wafer 620 at 9.4° off <100> plane and deposit a SiN blanket mask. Test anisotropic etch with KOH to determine crystal plane to tighter tolerance than wafer flat edge cut.
2) Pattern anisotropic etch in aqueous KOH the top wafer top-side to form precision pocket 608 centered on the optical axis of SMOC lens 606 for Flip-Chip actuator arm metal push ball.
3) Pattern anisotropic etch in aqueous KOH the bottom (inner) side of top wafer 620 to form a tapered angled v-groove 630 of fiber insert, a 45° angle turning mirror 604 along the silicon <111> plane, and a fiber insert stop. This requires front-side to back-side alignment of wafer.
4) Pattern metallize the bottom (inner) side of top wafer 620 on the 45° angled surface to form turning mirror 604.
5) Pattern anisotropic etch in aqueous KOH the top inner side of bottom wafer 622 to form a fiber buffer v-groove well.
6) Pattern anti-reflection (AR) coat (silicon-to-epoxy) the bottom side top (inner) side beneath the top wafer 45° turning mirror.
7) Fuse top wafer to bottom wafer using inner alignment marks for this silicon-to-silicon wafer fusion process. This process requires the removal of SiN etch stop material from the inner surfaces of top wafer 620 and bottom wafer 622.
8) Pattern photoresist on bottom side of bottom wafer 622 to form resist circle of SMOC lens. Requires front-side to back-side alignment of wafer. Thermally reflow resist to form spherical shape. Dry etch resist to form silicon lens and hard stop spacer ring. Use etch stop of SiN to allow the silicon lens shape to be etched as a recessed structure beneath the wafer surface.
9) Pattern anti-reflection (AR) coat (silicon to air) the bottom side of lens 606.
10) Pattern metallize bottom side of bottom wafer 622 to form solder pads 612 around hard stop spacer ring 610 on SMOC underside.
11) Singulate SMOCs from fused wafer stack by dicing to expose taper fiber insert.

Advantages of this silicon micromachined SMOC embodiment over an injection molded plastic SMOC embodiment are: (1) matching of thermal expansion of the SMOC to the IC silicon chip, (2) the ability to provide a hermetic seal of the optical path between the SMOC optics and IC optics. Both embodiments may use either metal bonding or adhesive bonding for SMOC to IC attachment.

Incorporating the collimating lens into the mount structure reduces fabrication costs relative to fabricating the two elements separately and it completely eliminates the cost associated with having to assemble the lens into the mount structure which would require current state-of-the-art methods for SOB (Silicon Optical Bench) optoelectronic packaging processing, such a SOBs with v-grooves, pits and pedestals.

Figure 2:
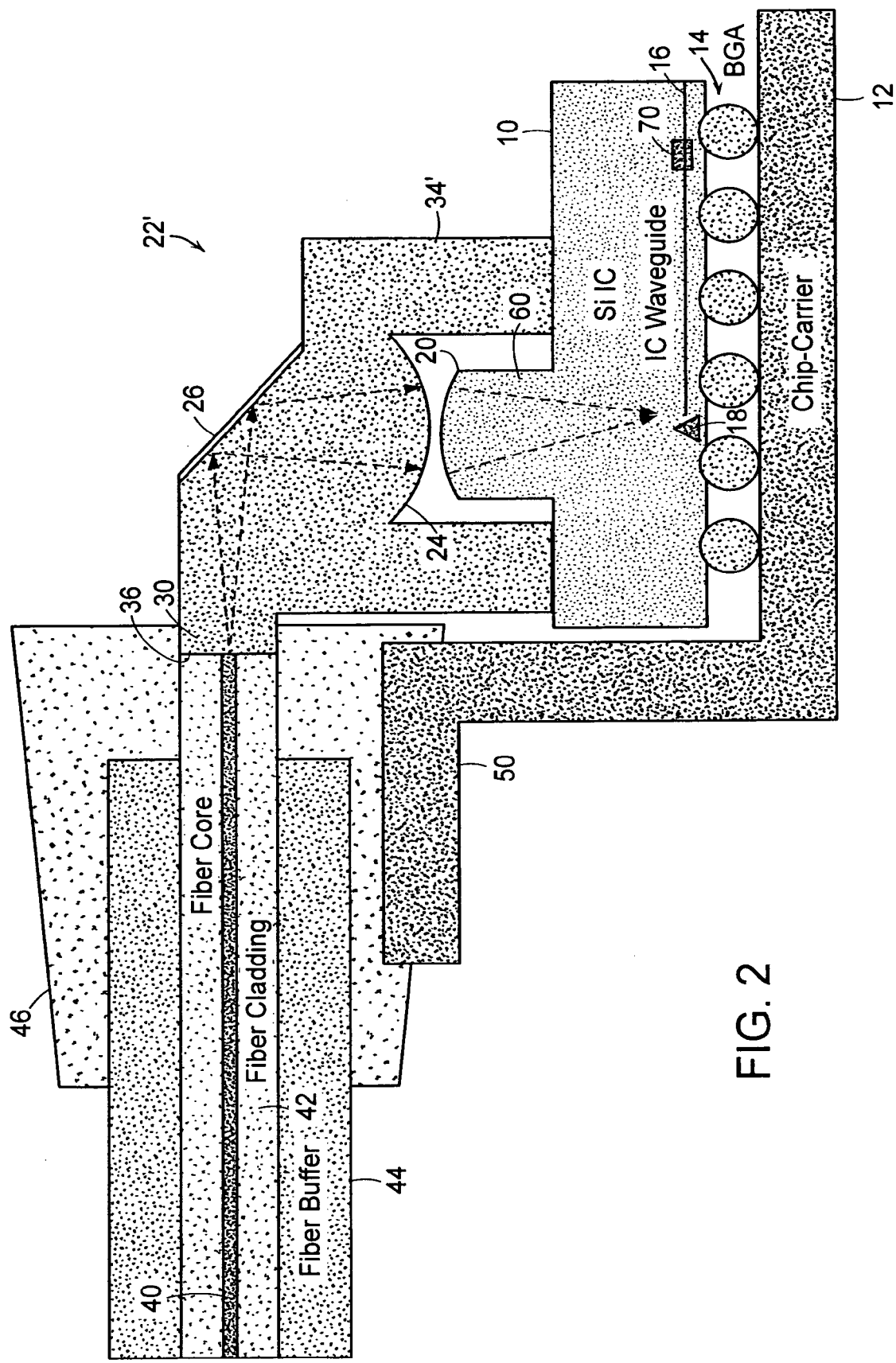
FIG. 2 is a schematic representation of another embodiment of a SMOC mounted on the backside of an IC chip.

Another embodiment is shown in FIG. 2. It is basically the same as the one shown in FIG. 1 except in two significant respects. First, lens 20 is located on a post 60 the extends above the backside of the IC chip 10. Second, the cylindrically-shaped tube support 34' of collimating lens subassembly 22' is longer than in the previously described embodiment to accommodate the height of the lens above the backside of the chip. All other features are the same as previously described and are thus numbered the same as in FIG. 1.

In the structure shown in FIG. 1, the Si lens is formed after the wafer thinning processing; whereas, in the arrangement shown in FIG. 2, the Si lens is formed before the wafer thinning processing. The structure of FIG. 1 does not constrain the processing method that can be used for wafer thinning and thus allows for the use of lower cost Chemical Mechanical Planarization (CMP) wafer thinning techniques, followed by Atmospheric Downstream Plasma (ADP) Dry Chemical Etching (DCE) to remove microcracks from the CMP processing. In contrast, the structure of FIG. 2, constrains the processing method that can be used for wafer thinning. Only those methods that can maintain a suitable Si lens pedestal sidewall can be used, such as, the Bosch-type process or a continuous $SF_6/C_xF_y$ isotropic etch.

Figure 3:
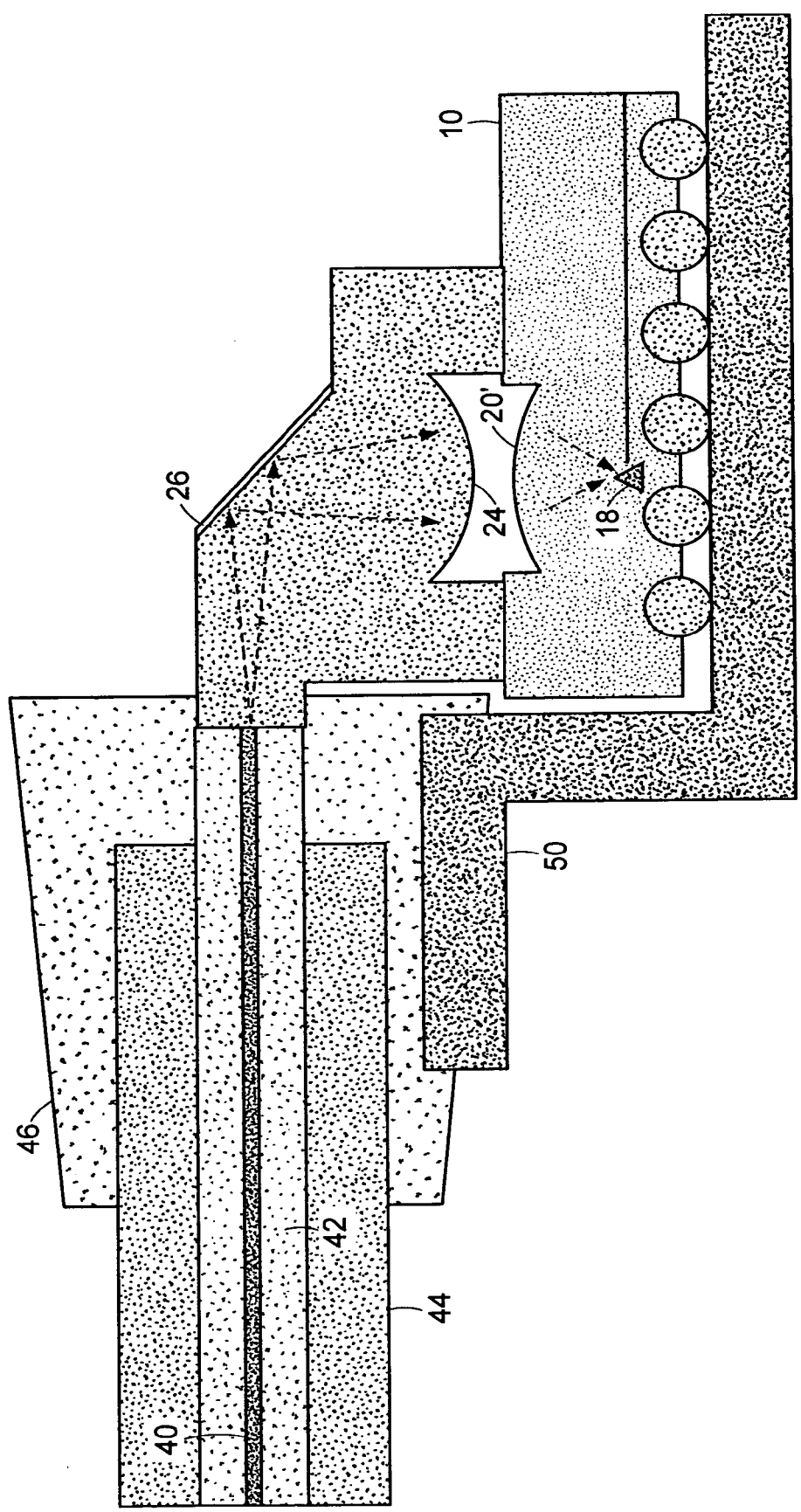
FIG. 3 is a schematic representation of another embodiment of a SMOC mounted on the backside of an IC chip.

Yet another embodiment is shown in FIG. 3. It is basically the same as the one shown in FIG. 1 except in one significant respect. Lens 20 is recessed below the backside of the IC chip 10, and SMOC lens 24 is above IC backside 10. The recess is formed during the same etch processing to form Si lens 20 with the addition of an etchant hard stop such as SiN deposited on the IC backside 10 and patterned around the lens 20. The recess of lens 20 allows for protection of the lens surface from damage during wafer handing and CMP processing. The lens recess may also be filled in with lower refractive index material such as silica by wafer level deposition and subsequent planarization. In this case, the lens optical prescription would be adjusted accordingly as well as anti-reflection (AR) coatings between the Si lens surface and the silica recess filler. An additional AR coating on the silica to air surface would also be required. All other features are the same as previously described and are thus numbered the same as in FIG. 1.

The optical design shown in FIG. 1 can accommodate a shorter focus distance to the 45° mirror at the IC waveguide by using a more curved Si lens with a shorter focal length and/or a smaller IC waveguide of wider acceptance angle for mode propagation. However, the use of shorter focal lengths for the Si lens translates into using a smaller collimated light beam between the IC and the coupling optics, which increases the placement tolerance of these optics relative to the IC waveguide optics for optical coupling. The nominal design of a 400 µm Si lens focal length and 2.5 µm by 3.0 µm IC waveguide mode size translates into a 100 µm collimated light beam diameter outside the IC Si lens which corresponds to a 5 µm to 10 µm placement tolerance for the external coupling optics to the IC coupling optics. Standard electronics automated assembly Flip-Chip equipment has a 5 µm placement tolerance, with higher tolerances down to 0.5 µm available at higher cost.

Methods may be used to increase the numerical aperture of the IC waveguide throat (i.e., opening of the waveguide), or the receiving angle to propagate coupled light, by increasing the waveguide cross-section near the waveguide throat and adiabatically tapering the waveguide to smaller sizes for distribution around the optical ready substrate. Optical alignment tolerances are directly proportional to the size of the waveguide throat cross-section and larger waveguide throats allow for wider placement tolerances for coupling optical components. IC fabricated waveguides are not dimensionally constrained laterally for waveguide tapering due to lateral dimensions being lithography defined, however vertical waveguide tapering is constrained by deposition processing. Methods to increase waveguide throat dimensions involve transfer of three dimensional features in tapered photoresist reflow by selective etch processing as described above for fabrication of the IC turning mirror and IC lens, as well as by evanescent coupling between vertical waveguides.

Monitoring Optical Coupling from SMOC to IC:

Referring again to FIGS. 1 and 2, to aid in the alignment and attach process, a monitor photodetector 70 is fabricated in the waveguide. Photodetector 70 is fabricated by using known techniques, an example of which is described in U.S. Ser. No. 10/856,127, entitled "Impurity-Based Waveguide Detector System," incorporated herein by reference. The detector absorbs at the wavelength of the optical signal and it is also partially transmissive at that wavelength so its presence results in a small attenuation of the signal that passes on to the rest of the optical distribution network or is a tap split of the waveguide to a terminal photodetector. Two pins of the chip-carrier pin-out (not shown) are electrically connected to the detector and optional integrated electrical amplifier for the photodetector and thus can be used to monitor the detector signal. By feeding this signal to an automated assembly motion controller, one can optimally position the upper coupling unit before attaching it permanently to the backside of the wafer. These detector pin-outs can also be incorporated into the system self-monitor functions and provide access for field-serve troubleshooting and diagnosis.

An alternative method for measuring the optical alignment from the optical fiber of the "SMOC" to the IC waveguide is to use another turning mirror at the end of the waveguide or waveguide tap combined with a collimating lens in the IC above this end mirror. Light coupled into the IC waveguide exits out the IC backside (nominal configuration) at the end of the IC waveguide. This light exiting the IC backside may be easily monitored using a wide area photodetector placed above the exiting collimating lens. This method of monitoring optical coupling of the SMOC to the IC waveguide does not require the use of electrical input/output (I/O) pins of the IC, which are considered of high value in the IC and chip carrier pin-out of state-of-the-art ICs.

In both configurations for monitoring optical coupling from the SMOC to the IC, this optical coupling signal may be fed to the automated assembly motion controller in order to optimize the optical coupling during the align and attachment of the SMOC to the IC. Modulated light signals may be used to improve this feedback signal's signal-to-noise ratio.

Figure 7A:
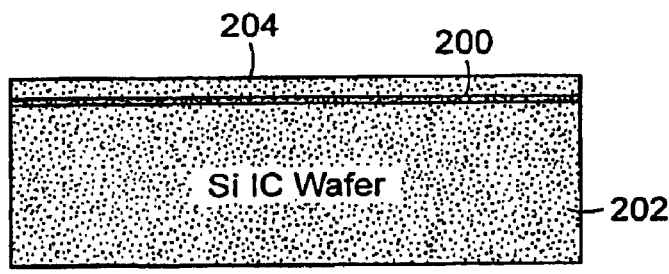
FIGS. 7A-E present a flow diagram of a process for fabricating the mirrors in the optical waveguides.

Fabrication:

In general, the process for fabricating an IC chip with a optical coupling involves the following phases. Referring to FIG. 7A, a network of optical waveguides 200 is first fabricated in a silicon substrate 202 and a layer of epitaxial silicon 204 may be grown on top of the substrate to cover the network of optical waveguides 200 (FIG. 7A). Known techniques are used to fabricate these buried optical waveguides, such as those described in U.S. Ser. No. 10/280, 492, entitled "Optical Ready Wafers," incorporated herein by reference. At this time, optical detector area also fabricated into the waveguides using for example the previously mentioned technique described in U.S. Ser. No. 10/856,127, entitled "Impurity-Based Waveguide Detector System."

The resulting structure includes a network of optical waveguides on the surface or buried beneath an overlying Si layer that is of sufficient quality to permit microelectronic circuitry to later be fabricated therein using conventional fabrication techniques.

Figure 7B:
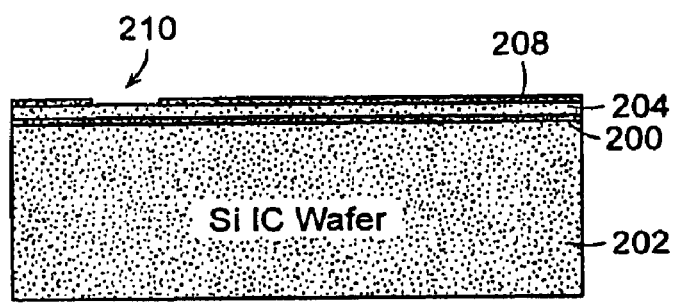
Figure 7C:
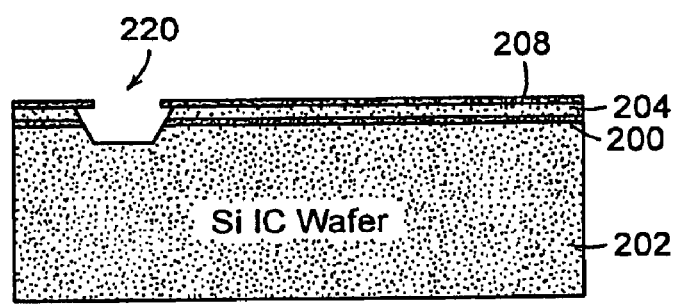

Referring to FIG. 7B, a mask layer 208 of SiN is then deposited on the wafer and it is patterned to define the openings 210 at which the waveguide mirrors are to be fabricated. Once the openings are defined, a dry etch is used to form trenches 220 in the silicon at the locations of the openings (FIG. 7C). The trenches are etched down to below the optical waveguides. In this example, the dry etch process is a continuous $SF_6/C_xF_y$ plasma etch or other etch chemistries, such but limited to $Cl_2$/HBr etch, that undercuts the mask and forms a trench with angled walls. By appropriately selecting the etch process parameters and the orientation of the crystal silicon substrate, it is possible to control the angle of the walls that are produced. The selection of etch chemistries and etch processing are required to leave an optical smooth surface, i.e. less than 20 nm $R_a$ surface roughness, at the mirror.

Figure 7D:
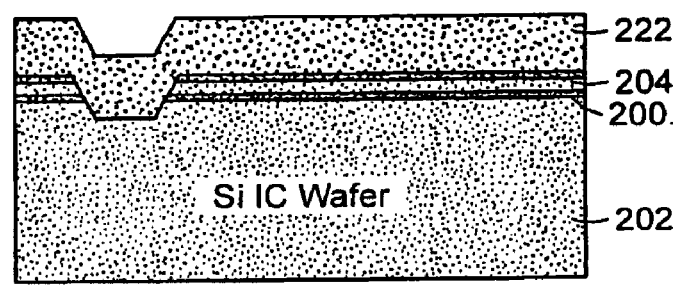
Figure 7E:
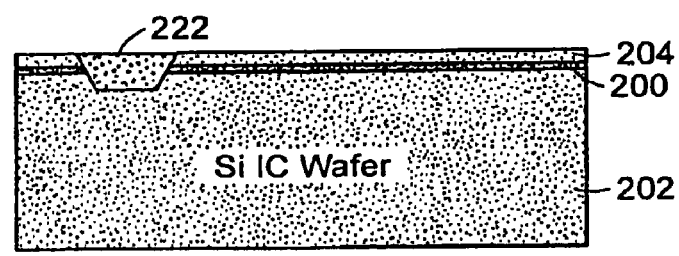

After the trenches 220 are formed, etch mask 208 is removed and the trenches are back-filled with a low index material 222, e.g. $SiO_x$ (FIG. 7D). Finally, the front of the wafer is planarized to remove the $SiO_x$ above the regions in which the microelectronic circuitry will be fabricated (FIG. 7E). The resulting $SiO_x$ filled trenches define angled walls at the end of the optical waveguide, which function as mirrors to radiation.

After the optical waveguide mirrors have been fabricated, microelectronic circuitry is fabricated into the topside of the wafer using conventional fabrication techniques, e.g. CMOS fabrication techniques. Then, standard Back End of the Line (BEOL) processing is used to interconnect the devices that were fabricated in the topside of the wafer.

At that point, the integrated Si lenses are fabricated in the back-side of the wafer using any of a number of different known techniques. One such technique is involves using gray-scale lithography in combination with wafer thinning. The Si lenses are located relative to the optical element at IC waveguide (e.g. 45° mirror) within the optical design x-y-z axes tolerances. Typically, patterning for IC back-side lithography will require alignment to IC front-side fiducials by a see-through-substrate method or by other alignment process methodology. Infrared cameras are one way of providing the required alignment tolerance for IC backside lithography to IC front-side fiducials.

To minimize lens diffractive characteristics allowing the higher optical coupling efficiencies of a purely refractive lens, one can minimize the number of gray-scale lithography steps. Methods to minimize lens gray-scale steps include photoresist reflow or other methods. If etch depths are constrained, the lens could be a diffractive Fresnel lens design. Another method to fabricate these lenses in the IC silicon is by photolithographic patterning of circular posts of photoresist, which are then reflowed thermally to form round structures on the IC with optically smooth surfaces. The shape of the lens is then transferred from the reflowed photoresist into the silicon wafer by etch processing, as described above, to leave a lens structures in silicon of desired optical prescription and qualities such as optically smooth and without optical aberrations.

As noted previously, optical element fabrication may occur either before or after IC substrate thinning. The amount of IC substrate thinning will vary from application to application and the techniques described herein allow for the optical design to accommodate different IC thickness and achieve the optical coupling requirements. ICs substrates are thinned for thermal conduction and 3d stacking reasons from initial substrate thickness in the range of 400 μm to 750 μm to a thinned range of 50 μm to 300 μm.

After the lenses have been fabricated, an optical test at the wafer level is performed. This involves shining a wide bright beam at the back-side lens on the wafer while probing the wafer front-side to detect the optical signal.

Assuming that the wafer passes the optical test, the wafer is then divided into individual IC chips. Each IC chip is then mounted onto a chip carrier using a ball grid array to make electrical contacts to the pads on the chip. When appropriate, a heat sink with an opening aligned with the integrated backside lens is also mounted on the backside of the chip.

Finally, the SMOC collimating lens subassembly is aligned with the lens and affixed to the backside using an appropriate bonding technique, e.g. epoxy or metal bond. During this process, active feedback from the monitored current signal generated by the biased IC monitor photodetector can be used to align the subassembly properly.

Alternative Geometries:

For the embodiments of FIGS. 1 and 2, the collimated optical signal from the coupler passes directly into a focusing lens that is formed in the backside of the chip. The focusing lens then focuses the optical signal into a buried optical waveguide located near the front side of the IC chip. Other configurations, however, are possible as indicated in FIGS. 8A-C.

Figure 8A:
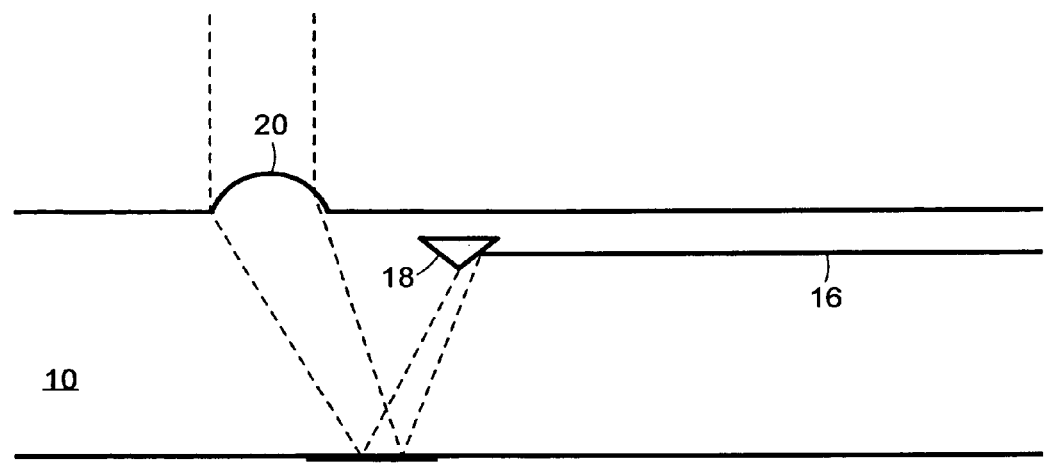
FIG. 8A-C show alternative geometries for coupling optical signals into or out of an optical waveguide on an IC chip.
Figure 8B:
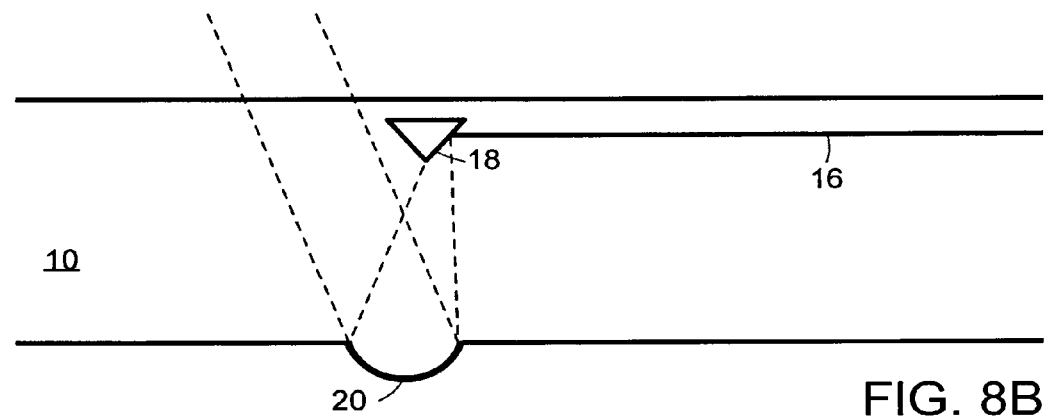
Figure 8C:
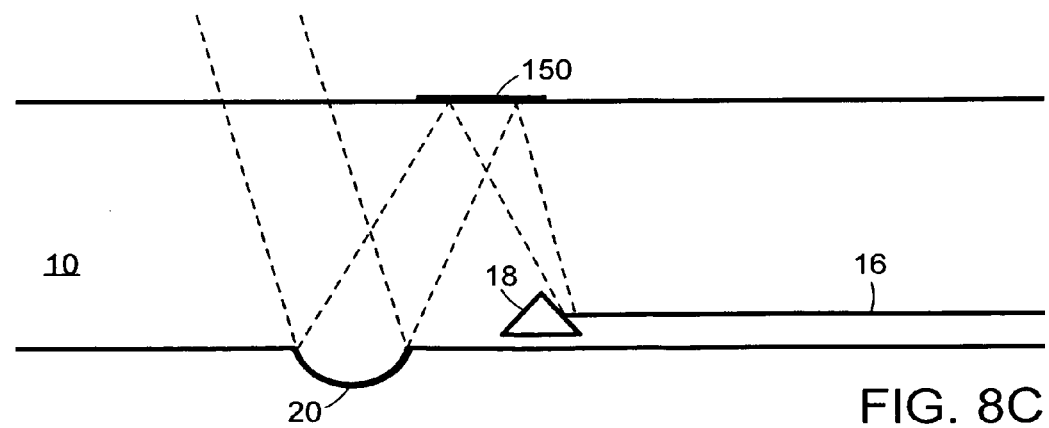

In FIGS. 8A and 8C, the integral focusing lens 20 is formed on the front side of the IC chip, instead of on the backside as described above. In the configuration of FIG. 8A, the collimating lens subassembly (not shown) is mounted on the front side of the IC chip in alignment with focusing lens 20. The collimated beam passes through the focusing lens, which directs it toward a reflecting portion (or mirror) formed in the backside. The mirror reflects the beam back toward the front side of the IC chip to where the mirror within the optical waveguide is located. For this configuration, the focal length of the focusing lens is about twice the thickness of the IC chip.

In the configuration of FIG. 8C, the collimating lens subassembly (not shown) is mounted on the front side of the IC chip and focusing lens 20 is formed in the front side of the chip. Lens 20 is coated with a reflecting film (e.g. metal deposited film) so it functions in a reflecting mode. On the backside of the chip, there is another reflecting film, which forms a mirror 150. The collimated optical beam from the lens subassembly passes through the backside and through the chip and into lens 20 on the other side of the chip. Lens 20, backside mirror 150, and waveguide mirror 18 are all aligned so that lens 20 focuses the reflected collimated beam into optical waveguide via waveguide mirror 18. For this configuration, the focal length of the focusing lens is again about twice the thickness of the IC chip In the third configuration shown in FIG. 8B, focusing lens 20 is located on the backside of the chip and the collimated lens subassembly (not shown) is affixed to the front side of the chip. As in the configuration of FIG. 8C, lens 20 is coated with a reflecting film (e.g. metal deposited film) so it functions in a reflecting mode. The collimated optical beam from the lens subassembly passes through the front side of the chip and through the chip into lens 20 on the other side of the chip. Lens 20 and waveguide mirror 18 are aligned so that lens 20 focuses the reflected collimated beam into optical waveguide via waveguide mirror 18. The focal length of focusing lens 20 in this configuration is comparable the focal length required of lens 20 in the configuration of FIG. 1.

Figure 9:
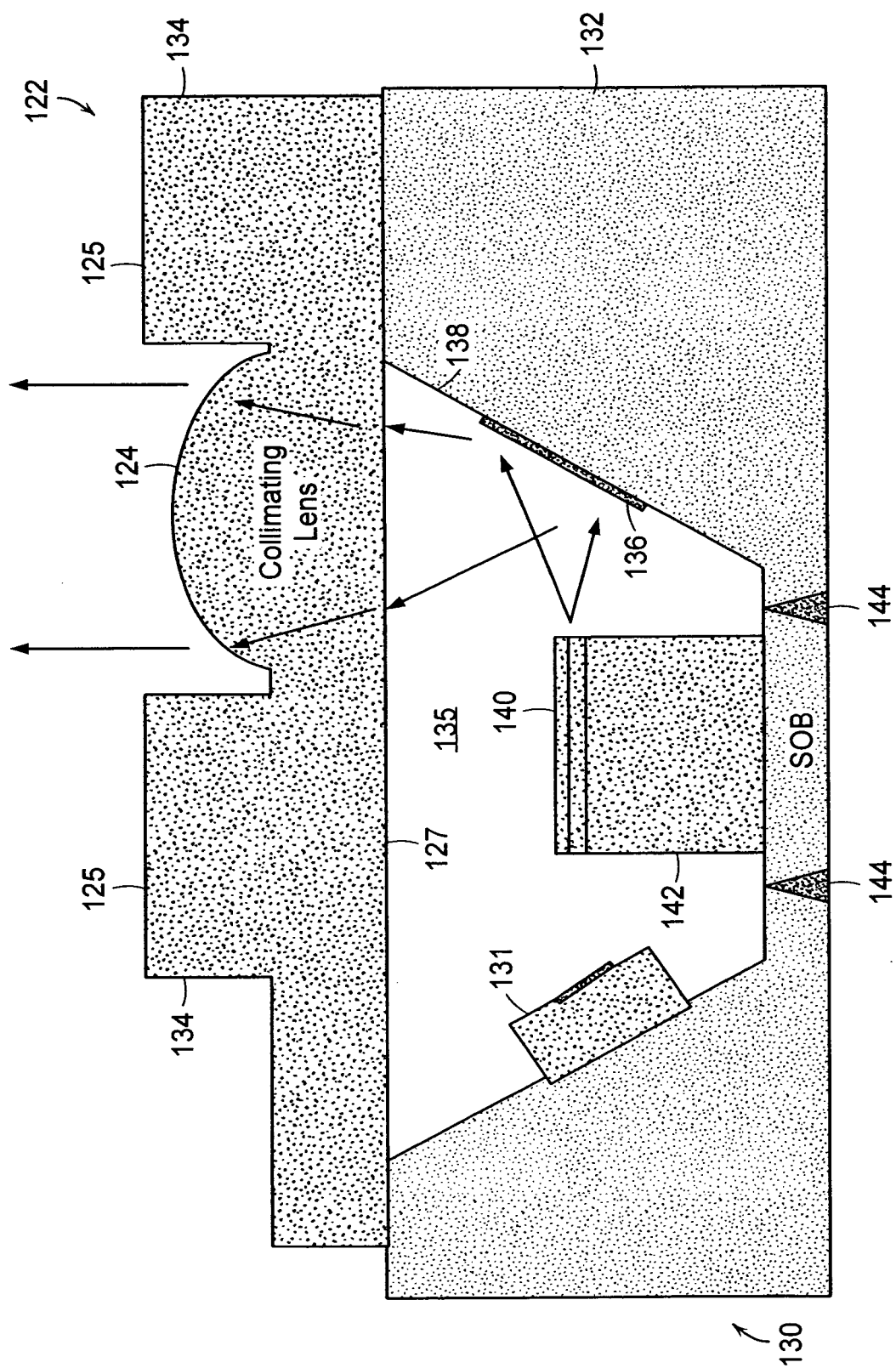
FIG. 9 is a schematic representation of an optical signal source affixed to a SMOC.

Light Source:

FIG. 9 illustrates an embodiment in which a light source is fabricated onto a collimating lens subassembly 122. In a manner that is similar to what was described above, subassembly 122 attaches to the backside of the IC chip (not shown). Subassembly 122 includes a collimating lens 124 and a cylindrically-shaped wall 134 surrounding lens 124 and providing a flat surface 125 which mounts up against the backside of the IC chip. In this case, however, instead of having an extension onto which the optical fiber is connected, subassembly 124 has a flat surface 127 onto which a light source assembly 130 is affixed. Light source assembly 130 is made from a silicon optical bench (SOB) 132 with a trench etched into it to form an SOB cavity 135. The trench is formed by performing, for example, an anisotropic sidewall Si KOH etch. In the described embodiment, the etch produces sloped sidewalls having an angle of 54.7°. A metal film (e.g. Au) is deposited onto one of the angled sidewalls 138 to form a mirror 136. Mounted on the bottom of the trench, there is a light source 140 (e.g. an edge emitter laser diode) affixed to the top of a platform 142 which positions light source 140 so that the light coming from it will be redirected by mirror 136 up into collimating lens 124 of subassembly 122.

An edge emitter laser diode is used in the described embodiment because edge emitters typically provide more optical power than other light sources. However, there is no restriction on the light source type that can be used. If a vertical surface cavity emitter laser (VCSEL) is used, it would be positioned directly underneath the collimating lens and during operation the light beam would be emitted from the VCSEL at the collimating lens focal point. In this case, no reflecting surface or mirror on the cavity sidewall mirror would be necessary. Other light sources that are easily accommodated by this packaging configuration are: Fabry-Perot FP lasers, DFB (Distributed Feedback) lasers, DFB-EAM lasers, CW lasers, light emitting diodes, VCSELs and others.

Light source 140 and platform 142 are bonded to the base (or walls) of SOB cavity 135, e.g. by metallic bonding. Additional components such as: monitor photodiodes; mirrors; modulators; optical isolators; electrical impedance matching circuitry; electro-static-discharge (ESD) protection elements; thermal control elements such as thermoelectric coolers (TECs), heaters, and thermistors; and other functional elements may also be enclosed within the SOB cavity. For example, FIG. 9 shows a monitor photodiode 131 mounted in alignment with light source 140 for the purpose of monitoring the output of that light source.

Collimating lens subassembly 122, which functions as a window for SOB cavity 135, is sealed hermetically to SOB 132 by metallic bonds or other types of bonding. Forming a hermetically sealed cavity addresses potential light source reliability concerns that exist for cavities that are not hermetically sealed. However, non-hermetically sealed cavities may certainly be used but at the expense of potentially lower reliability of the light source.

Electrical feed-throughs 144 extend into SOB cavity 135 and provide for electrically connecting to light source assembly 140. They are fabricated by Si wafer through-etch methods and filled with metal by plating, thin film sputtering or evaporation, thick film processing or other methods. These electrical feed-throughs can also form a hermetic seal to the SOB cavity.

The implementations are not limited to silicon-optical-bench materials or SOB processing. Alternative materials and processing to fabricate this light source packaging include: thick film processing with single or multiple layers; micro-machining processing including micro-electromechanical-system (MEMS) processing methods; low temperature co-fired ceramic (LTCC) processing; and other methods and materials.

Though the illustrated embodiment of FIG. 9 shows collimating lens 124 as being an integral part of subassembly 122, it may instead be a separate component that is mounted onto the portion of the structure that serves both as a window and a mounting surface which abuts against the backside of the IC chip. One method for fabricating subassembly 122 is by glass molding. Alternatively, other fabrication methods include forming arrays of lenses in glass substrates by wafer level etch methods, including but not limited to gray-scale lithography and sinter reflow processing, or by other methods. Other materials that can be used for the window, lens, and mounting structure are Si, GaAs, InP, ZnSe, NaCl, and other crystal materials; organic materials such as polymers, cast polymers, adhesives, and other organic materials; and inorganic materials such as quartz, fused silica, ceramics; and other materials.

Figure 11:
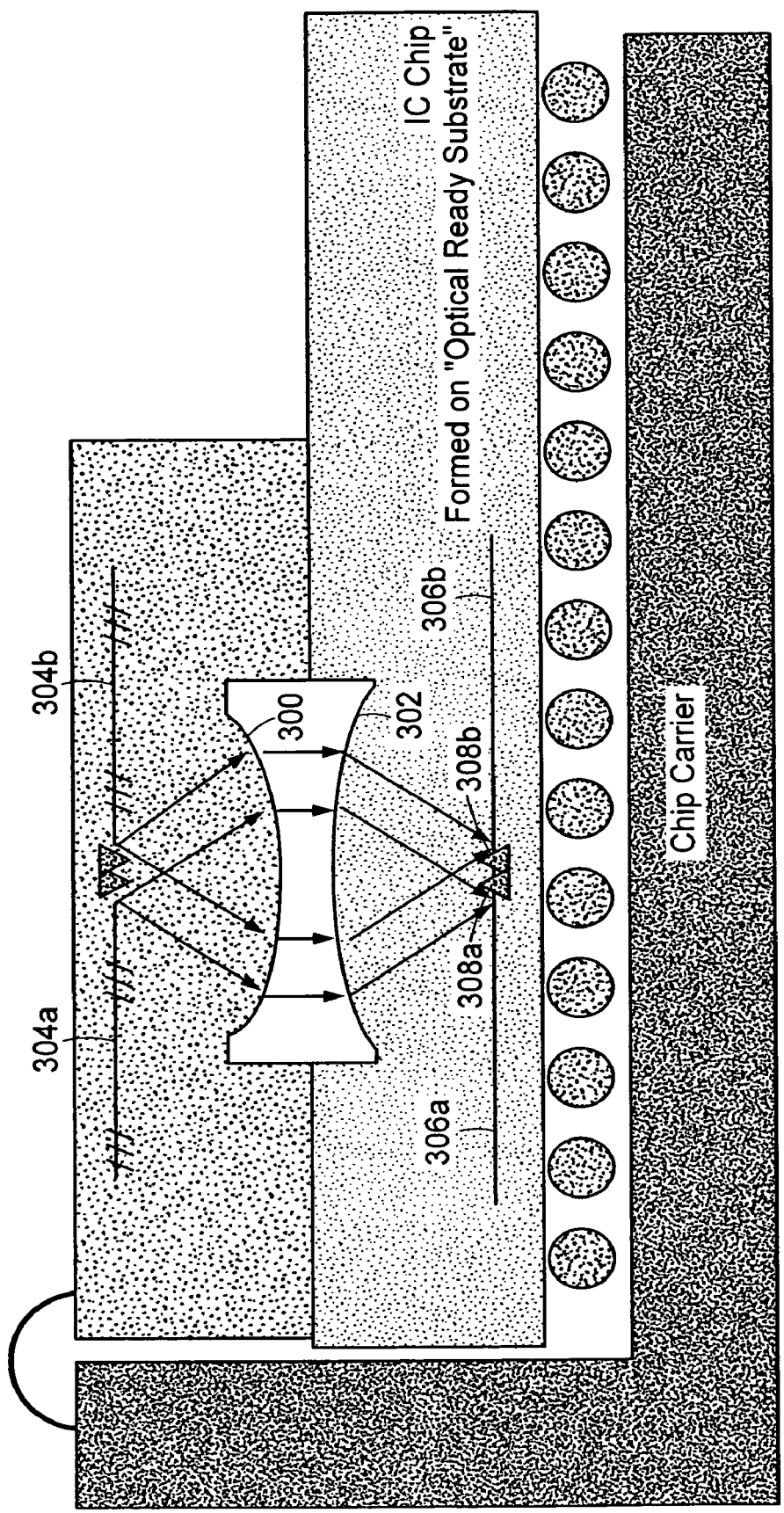
FIG. 11 shows an embodiment in which multiple laser sources are coupled through a single lens system to multiple different optical waveguides in the IC chip.

It should be noted that there are other modifications that could be made to the embodiment shown in FIG. 9. For example, to provide a mechanism for actively aligning the collimated beam, mirror 136 could be 3D MEMS tilting mirror which steers the beam in response to control signals for optimal optical coupling to the IC waveguide or for optical switching to couple to a different IC waveguide for configurations such as shown in FIG. 11 with multiple receive waveguides under the same IC lens.

Figure 10A:
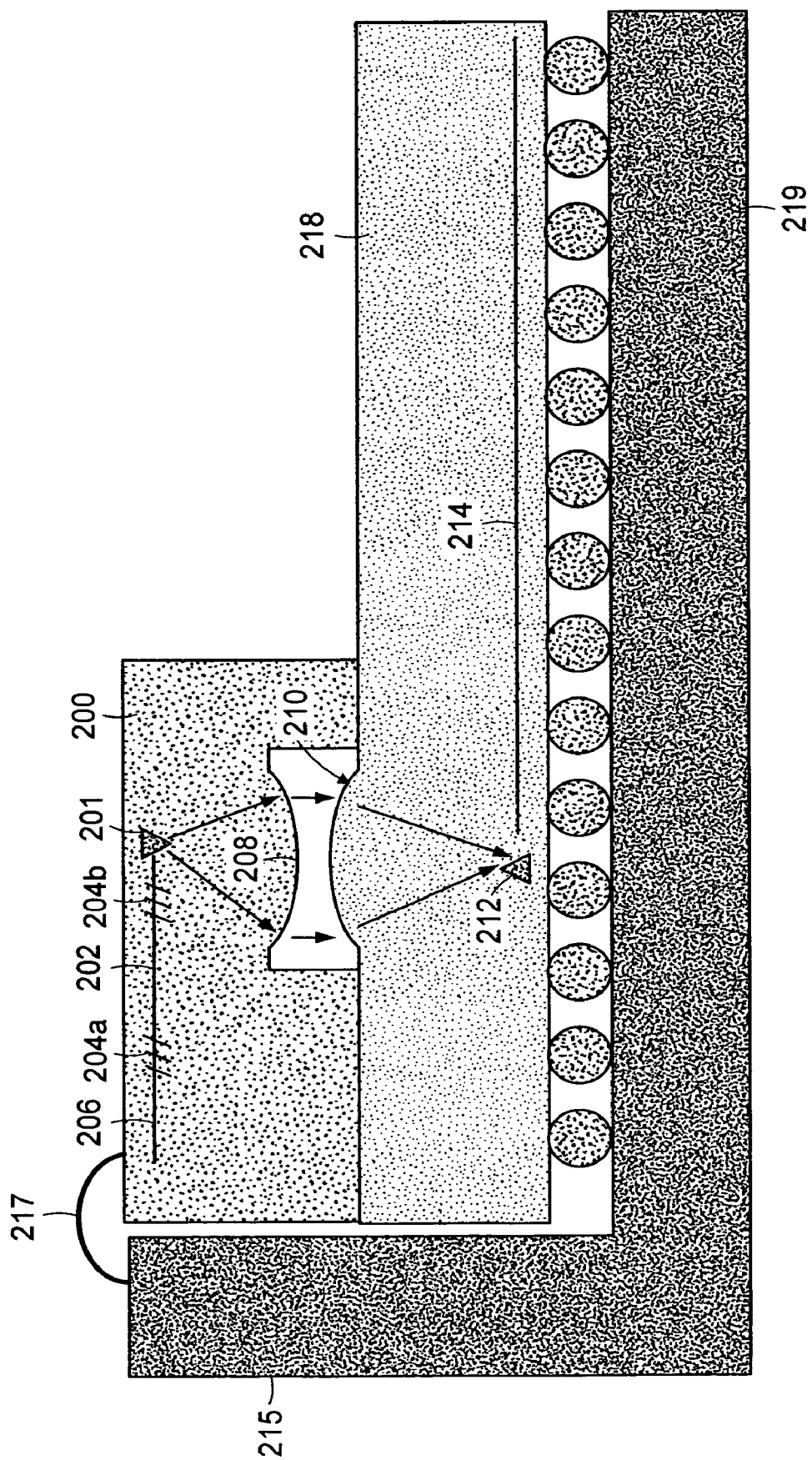
FIG. 10A is a schematic of "zero-level packaging" of a laser source allowing optical coupling to the IC waveguide, optical fiber, or other waveguides.
Figure 10B:
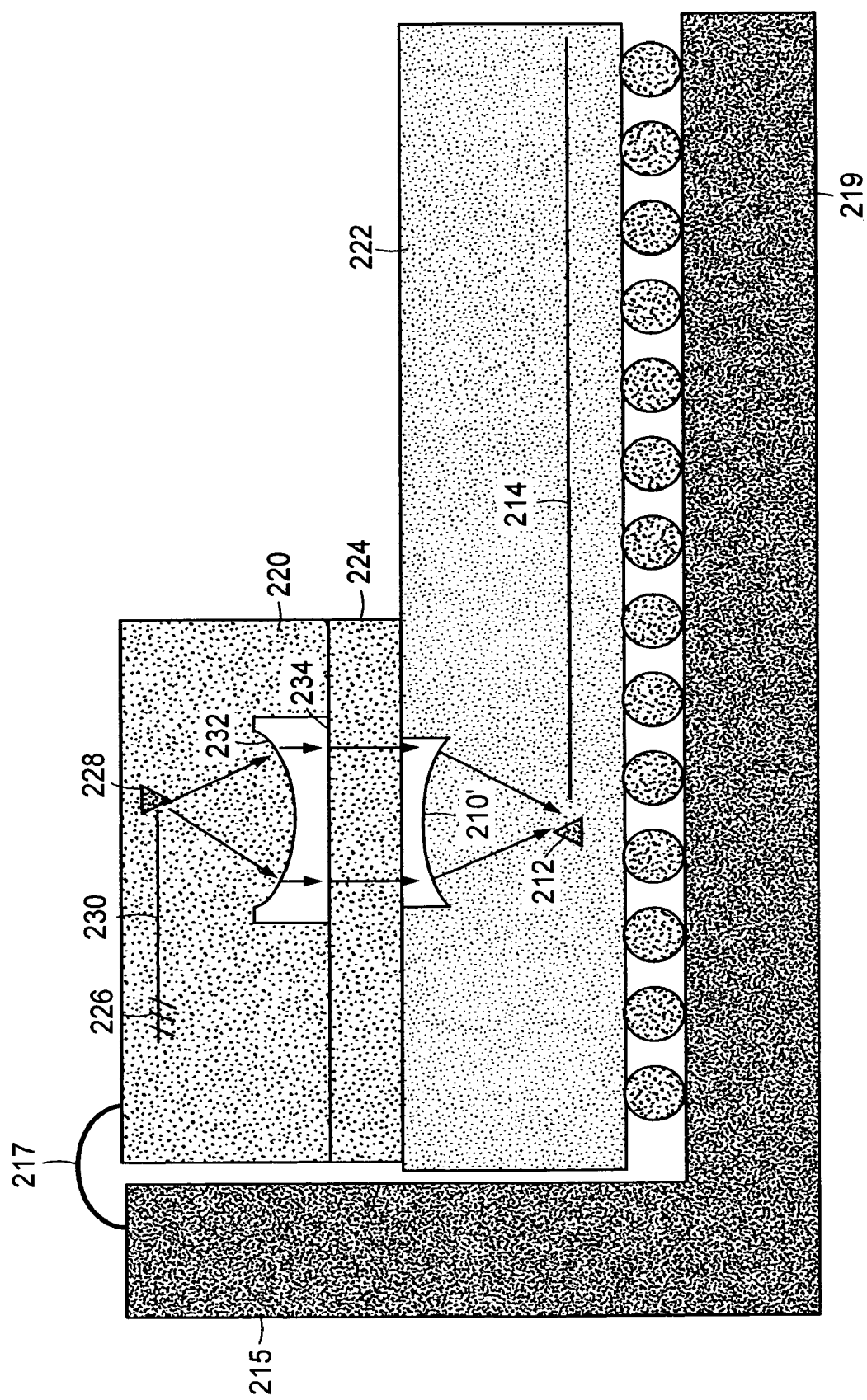
FIG. 10B is a schematic of another embodiment of "zero-level packaging" of a laser source allowing optical coupling to the IC waveguide, optical fiber, or other waveguides.

Light Source for "Zero Level Packaging" and Optical Coupling to IC:

The above-described concepts, fabrication techniques, and processing can also be applied to light sources to allow "zero level packaging" as shown in FIGS. 10A and 10B. This enables direct optical coupling from single mode laser waveguide cavities to single mode optical waveguides in the IC, to single mode or multimode optical fiber, and other optical waveguides by a low cost surface mount interface. The laser cavity or LED light source is hermetically sealed from the outside environment and the optical flux density at its interface with the environment is sufficiently low so as not to limit the reliability of the light source. Typically, laser reliability is governed by the susceptibility of its facet's reflective coating to being damaged due to high optical flux density across the small area (typically a few square micrometers) especially if organic compounds are present near the laser facet.

In the configurations shown in FIGS. 10A and B, the optical coupling interface is typically between 50 μm to 500 μm in diameter, resulting in a optical power flux densities lower by a factor of 400 to 40,000 lower than for edge emitting laser facets. Loss of laser reliability with increased temperature is also decreased due the removal of one of the main failure mechanisms by this optical coupling configuration.

In embodiments that involve a light source for "zero level packaging," a turning mirror is fabricated in the path of the laser waveguide to direct the light beam through the wafer and a collimating, or pseudo-collimating, lens is formed in the wafer to effectively make the light source a Surface Mount Optical Coupler "SMOC". Both the turning mirror and collimating lens are formed by the wafer level batch fabrication methods described above. Nominal design value for the turning mirror is 45°. The optical coupling interface and mounting attachment structure to maintain optical alignment are designed for automated surface mount pick and place attachment processing. Light sources are fabricated using III-V semiconductor materials and the methods for forming the turning mirror and collimating lens are from the same selection of methods described above with different optimization of etch rates, etch selectivity, and optical design for different refractive indices of GaAs, InP, and other light source materials.

Two configurations are shown. In FIG. 10A, a DFB laser source chip 200 containing a turning mirror 201 positioned outside a laser cavity 202 that is formed by laser cavity reflectors 204a and 204b (e.g. Bragg gratings) fabricated along the axis of a waveguide 206. Examples of such lasers are Fabry-Perot lasers without edge facet reflector coating. Such lasers, if directly modulated, provide the whole laser source at zero level packaging. This packaging configuration integrates well with laser sources with electro-absorption modulators (EAM) along the laser waveguide prior to the turning mirror to provide externally modulated laser sources at zero level packaging.

The laser beam from the cavity formed by reflectors 204a and 204b reflects off of turning mirror 200 and is directed down to a collimating lens 208 formed in the opposite side of laser source chip 200. The collimated beam from collimating lens 208 passes through a focusing lens 210 that is etched into the backside of an IC chip 218 onto which laser source chip 200 is directly bonded, in a way that is similar to what was previously described. The focused beam from focusing lens 210 then reflects off of a second turning mirror 212 and into an optical waveguide 214 of a optical signal distribution network that was formed near the front side of an optical ready substrate 218 (or IC chip). As before optical ready substrate 218, which has microelectronic circuitry (not shown) formed ion it s front side is mounted onto a chip carrier 219. Electrical connections 217 (e.g. wires, circuit traces, etc) electrically connect laser source chip 200 to a sidewall of chip carrier 219. Laser source chip 200 might also include an integrated back-facet power monitor diode (not shown) for monitoring and/or controlling the output of the laser.

In FIG. 10B, which shows a laser source chip 220 mounted on the backside of an IC chip 222 (e.g. optical ready substrate) via a surface mount structure 224, a turning mirror 228 is formed in laser source chip 220 so that it is within the laser cavity itself. The laser cavity of this "external cavity laser" (ECL) incorporates a laser cavity reflector 226 (e.g. Bragg grating) formed within an optical waveguide 230, turning mirror 220, a collimating lens 232, and a second laser cavity reflector 234 located below collimating lens 232 on the surface of surface mount structure 224. In this particular embodiment, the substrate in which the laser is implemented is made of a III-V semiconductor material or some other semiconductor material that supports lasing. Because of the planar surface mount structure 224 that is present between laser source chip 220 and IC chip 222, a recessed focusing lens 210', which is etched into the backside of IC chip 222, is used.

It is desirable to incorporate planar reflectors for the ECL for lower cost fabrication and assembly. The external reflector may be a thin film reflector, an etalon, or other reflectors. These reflectors may be tuned to selectively reflect different wavelengths by various means such as thermal control, local heating of silicon membrane fabricated tunable etalons, liquid crystal cells, vernier resonance multiple gratings or filters, and by other means. Tuning of the external reflector tunes the wavelength of the light source. AR coatings may be applied to collimating lens 232 and to both sides of planar reflector structure 234.

Since light sources generate heat, the "zero level packaged" light source should have direct thermal cooling for more reliable operation. As shown in FIGS. 10A and B, the laser source structure is directly coupled to the IC backside and the IC heat sink actively cools the light source. Direct cooling paths above the laser source may be added for high power laser applications to increase the cooling capability of the assembly beyond the cooling duty available by the IC heat sink. Heat pipes, TECs and other methods may be used for cooling the "zero level packaged" light source.

If the light source is directly modulated this "zero level packaging" incorporates all that is needed for a laser source. If optical isolation is required to preserve the performance of the light source in the presence of optical back-reflections in the optical coupling path, planar optical isolators may be fabricated on the opposite side of the external reflector structure, i.e. outside of the laser cavity. Planar optical isolators have been recently introduced to the market by NanoOpto Corporation by applying polarizers formed by nano-imprint fabrication on two side of a Garnet crystal wafer. However, the costs for nano-imprint planar polarizers may be too high for application to optical coupling to ICs. Another possibility is to fabricate optical isolators using semiconductor processing equipment. A Garnet crystal wafer cut for 90° Faraday rotation of light polarization is metallized to 100 nm thickness on the wafer. Choices of metal include; Ti, W, Pt, and others. Photoresist of similar thickness is applied to the wafer and exposed to a line grid pattern using projection lithography to form metal line widths of 100 nm with 100 nm gap and pitch which create wire grid polarizers at different rotational angles on the Garnet crystals to form optical isolators. These dimensions ensure optical isolation of greater than 40 dB for the laser source. The external reflector is deposited one side of the Garnet crystal on top of a filler layer, such as silica, on top of the metal line grid. The wafer is then singulated to the device form factor and assembled using surface mount processing and either epoxy or metal bonds.

This above-described laser source packaging methods enable:

(1) Greatly lowered the light source cost, lower than all alternatives, including VCSELs,
(2) Elimination of costly edge facet reflector deposition processing, replacing it with low cost reflectors fabricated on planar substrates and assembled with low cost automated surface mount assembly processing,
(3) Elimination of high cost of components typical in packaging light sources,
(4) Greatly reduced light source footprint area by eliminating the laser external package (typically hermetic metal structures such as TO-Cans, DIL, butterfly and smaller form factor silicon-optical-bench (SOB) packages).
(5) Wafer level powered testing of lasers to determine known-good-die (KGD) prior to laser or laser array singulation.
(6) Integration with low cost surface mount alignment and attachment processing using existing automated assembly equipment.
(7) Wavelength tuning of the light source by tuning the ECL external reflector.
(8) Selective tuning of laser arrays from a non-selective laser blocks.

This zero level packaging concept applies to all laser packaging applications, including telecommunications, datacom, medical, sensor, industrial lasers and power cutting laser, optical data storage lasers, display lasers, and other applications.

Inter Chip Interconnects:

Other elements may be integrated outside of the SOB cavity including: electrical connections, thermal control elements, and other elements. In the described embodiment, the electrical connection is a flex-cable connection from SOB backside to the adjacent chip-carrier sidewall or to board mounts. Thermal control is achieved through use of: heat pipes or other thermal connections to the IC back-side heat sink; TECs on the SOB back-side for active cooling the light source through the SOB cavity wall (note that SOB cavity back-side thickness is thinned for thermal control considerations); and other means.

Light can also be coupled between two ICs in a stacked chip configuration. In such a configuration, two ICs with backside Si focussing lenses and 45° mirror at the IC waveguides are stacked backside to backside with a spacer in between the two ICs. The spacer provides a mount structure to attach the two ICs and prevent the backside Si lenses from touching. This can provide a way for multiple core CPU processors and parallel processors to communicate by optical coupling with each other and with their memory chips. The light beam between the two ICs is a collimated beam. The optical coupling between the two ICs is not sensitive to z-axis placement, i.e. separation distance between the two ICs.

Arrayed Optical Coupling to IC:

Optical coupling to IC applications may require optical coupling to more than one SMOC, waveguide, light source, or optical fiber to another IC. Configurations range from a single optical coupling, to one coupling into the IC and one coupling out of the IC, to any permutation of multiple couplings in and out of one IC. Optical clock signal distribution application may be limited to one optical coupling into the IC to two couplings for signal routing into ICs in series. However, optical signal inter-chip and intra-ship communication applications will likely need a larger optical routing network including arrayed optical coupling to the IC. Arrayed optical coupling to IC for wavelength division multiplexing configurations will be necessary to meet the very high communication rates, 10 Gbps to 100 Tbps, of next generation computers. In order to couple a large number of optical wavelengths, such as 32 channels at 2 nm channel spacing, arrayed optical coupling packaging solutions will be necessary to meet the low cost requirements of these applications. Hence, arrayed optical coupling solutions to the IC will be needed.

The optical coupling to IC concepts described herein apply directly to arrayed coupling to ICs. Multiple optical paths may be integrated together into a single SMOC comprising multiple optical fibers, multiple SMOC lenses, and multiple IC lenses, turning mirrors and waveguides. In such arrayed configurations, the alignment and attachment processing for the optical coupling of the SMOC is the same as for a single optical coupling. The assembly cost savings are in addition to the lower bill-of-materials (BOM) costs for arrayed coupling due to the nature of injection molded plastic SMOCs, batch fabrication silicon micromachined SMOCs, silicon wafer level fabrication of IC lenses, turning mirrors, and waveguides.

FIG. 11 is an example of using a single lens system including a collimating lens 300 and a corresponding focusing lens 302 to couple laser beams from two DFB laser cavities 304a and 304b into two different SiGe optical waveguides 306a and 306b in IC chip 308 via corresponding turning mirrors 308a and 308b. The lens systems (including collimating lens 300 and focusing lens 302) maps the laser beam coming from each turning mirror in the laser source chip into a corresponding different turning mirror in the IC chip. Though this shows only two sources and two optical waveguides, it should be understood that the arrays of sources and the arrays waveguides could include more than two elements in each array.

Arrayed optical coupling to arrayed light sources (such as discrete packaging, integrated in array packages, integrated as discrete SOB packages, integrated as arrayed SOB packages, integrated as discrete SOB SMOC packages, integrated as arrayed SOB SMOC packages, integrated as discrete zero level SMOC packages or integrated as arrayed zero level SMOC packages) will be necessary for cost effective channel wavelength multiplexing. The optical coupling solution described herein applies to coupling to discrete IC chips, arrayed parallel and serial IC chips, to optical multiplexing and demultiplexing chips such as planar arrayed waveguide grating (AWG) multiplexer formed in silica on silicon, in organic waveguides, in optical ready silicon substrates, in III-V semiconductor substrates, in injection molded thin film filter wavelength multiplexers and demultiplexers assemblies, in Bragg grating and fiber Bragg grating (FBG) wavelength multiplexers and demultiplexers assemblies, in free space grating wavelength multiplexers and demultiplexers assemblies, waveguide mixers and splitters, and any other configuration or permutation of these configurations.

Figure 12:
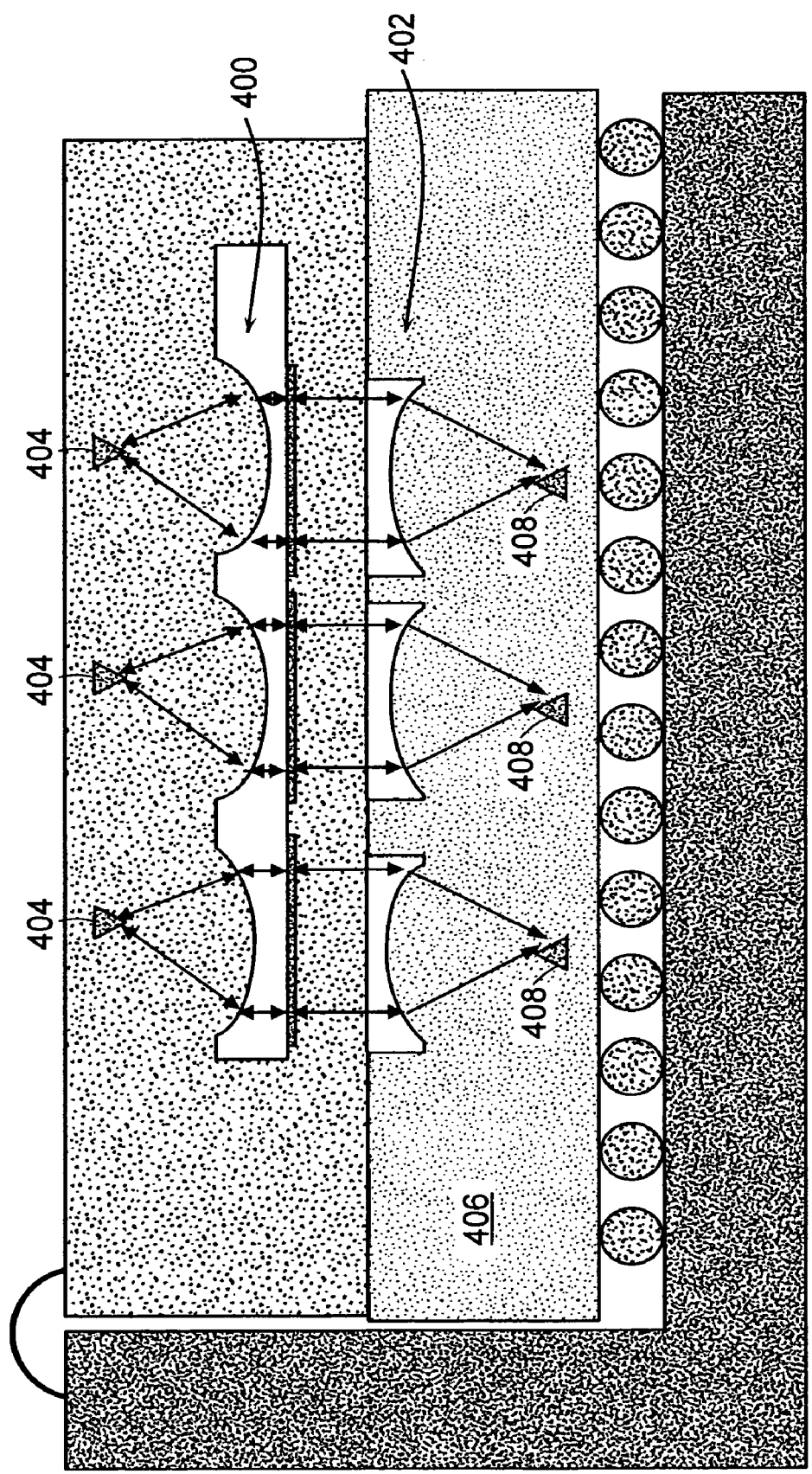
FIG. 12 shows an embodiment in which an array of sources is coupled through a corresponding array of lens systems to multiple different optical waveguides in the IC chip.

FIG. 12 is an example of using an array of lens systems (each including an array of collimating lenses 400 and an array of corresponding focusing lenses 402) to couple laser beams from three laser sources (via an array of turning mirrors 404) into three different SiGe optical waveguides in IC chip 406 via an array of corresponding turning mirrors 408. Each lens systems in the array of lens systems (including a corresponding collimating lens and focusing lens pair) maps the laser beam coming from each turning mirror in the laser source chip into a corresponding different turning mirror in the IC chip. As, before, though this involves only three sources and three optical waveguides, it should be understood that the arrays of sources and the arrays waveguides could include less than three or more than three elements in each array.

Anti-Reflection (AR) Coating of Si Wafers:

State of the art methods to apply anti-reflection (AR) coatings to substrates rely on thin film evaporation of dielectrics for controlled thickness and uniformity in a vacuum chamber. These operations are typically run in a batch mode with manual loading of substrates onto rotating planetaries, manual loading of planetaries into a single vacuum chamber, requiring long chamber pump downs prior to deposition, operator supervision during deposition and manual chamber unloading and chamber preparation. This method of AR coating is not particularly suitable for AR coating of Si wafers for optical coupling to IC applications because: the required cost per wafer is approximately one to two orders of magnitude lower than state of the art methods, the cost of yield loss from wafer breakage due to manual handling, loading and unloading is too high for high value added 300 mm diameter Si wafers that have completed CMOS and BEOL processing, batch evaporation chamber AR coating would not be able to meet throughput requirements once optical coupling to IC solutions are accepted by the semiconductor industry for computer and CPU products.

AR coating of Si wafers by dielectric sputtering using load chamber airlocks, unload chamber airlocks, automated wafer handling, loading, chamber to chamber transfer, and unloading, and automated processing is necessary to meet the low cost and high throughput requirements for optical coupling to IC applications. Semiconductor in-line sputtering equipment can be reconfigured to meet the AR coating needs of this optical coupling to IC solution. In such configurations, multiple dielectric sputtering targets are located within one sputtering chamber configuration with atmospheric baffles separating deposition plasmas whilst allowing automated wafer transfer back and forth between deposition chambers for in-line continuous AR deposition. Deposition thickness and uniformity monitors in each chamber allow for continuous process control and quality assurance of the AR coating. Deposition layers for the AR coating typically include: silica, metal oxides, metal nitrides, other dielectrics and silicon. Reconfiguration of Applied Material's Endura™ automated in-line sputtering process equipment is ideally suited for these application needs.

MUX/DEMUX SMOC Optical Coupling to IC

Figure 13:
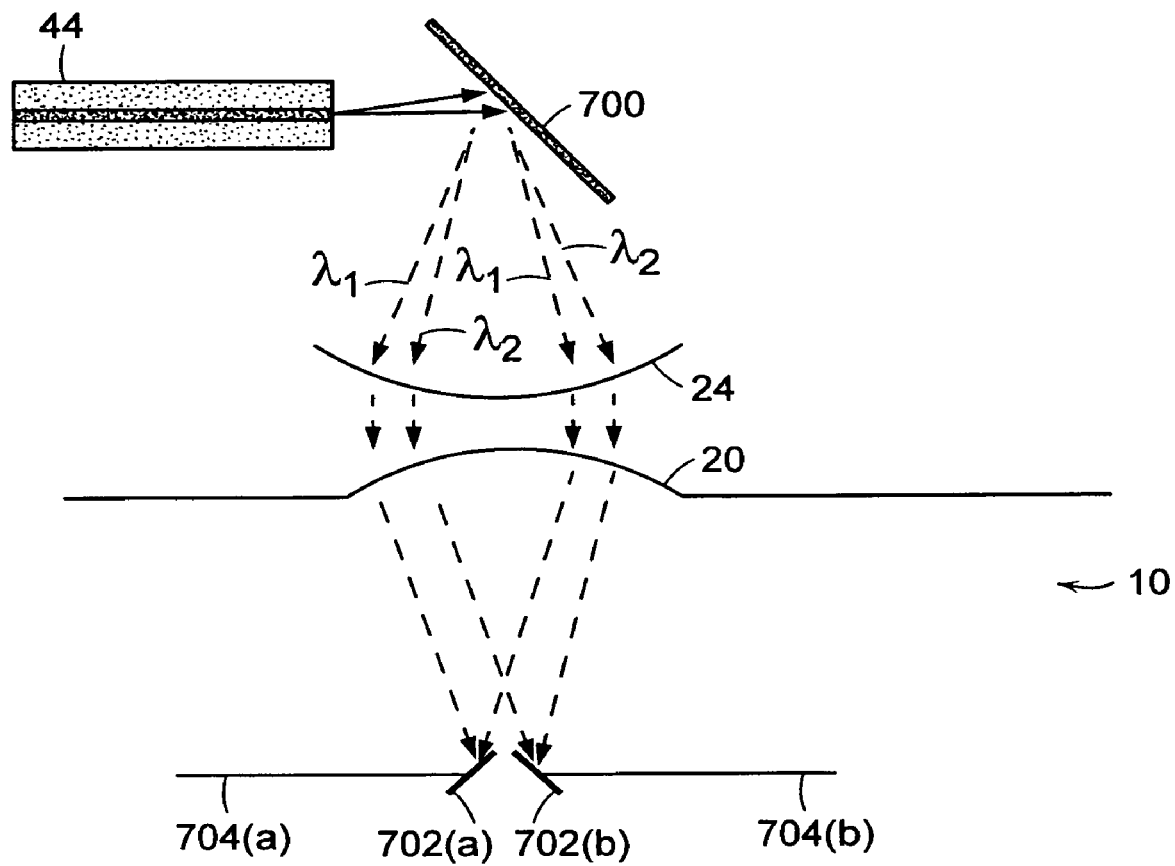
FIG. 13 illustrates free-space optical multiplexing by using a diffraction grating as the turning mirror.
Figure 14:
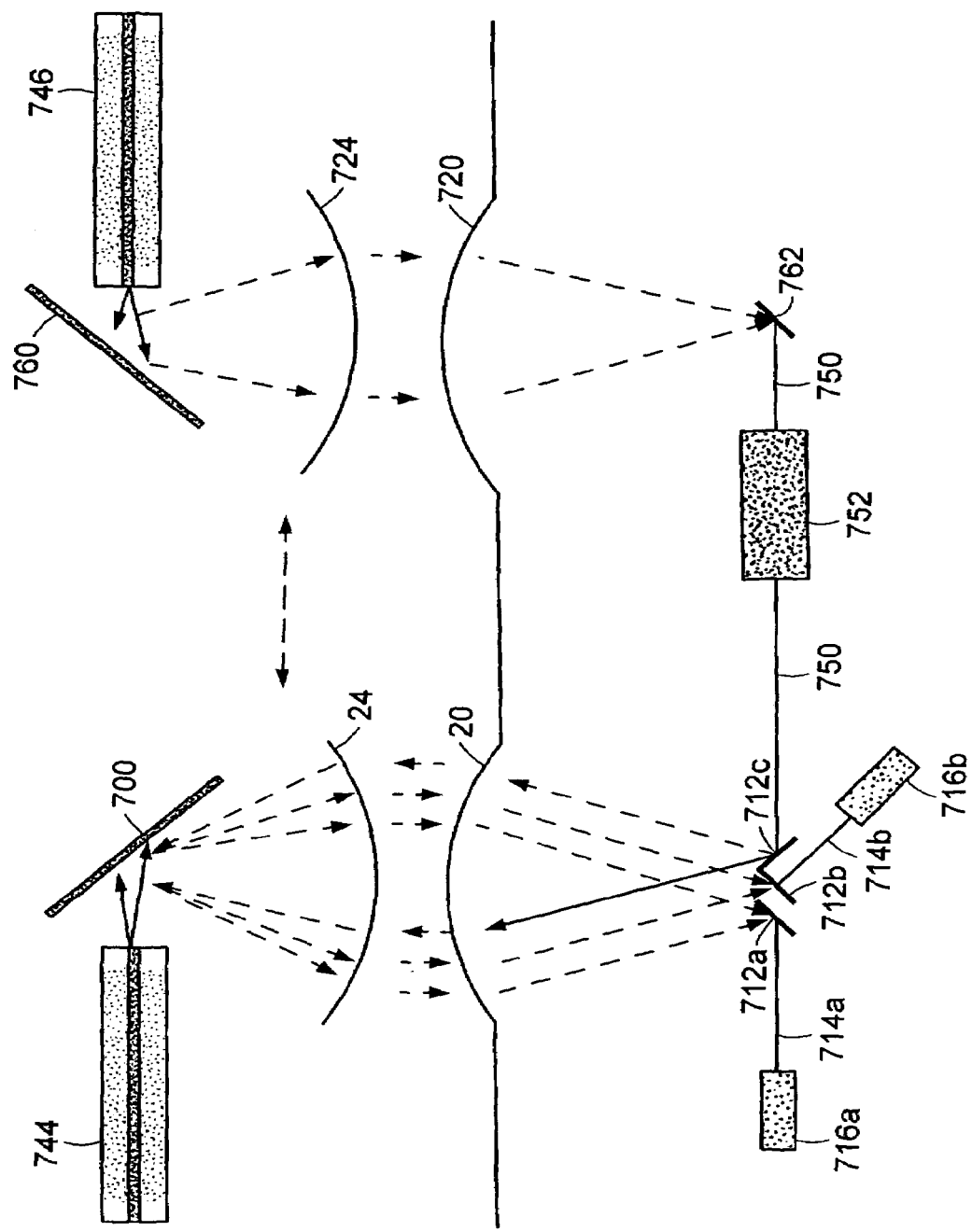
FIG. 14 schematically illustrates SMOC bi-directional multiplexer configuration for a Fiber-To-The-Home (FTTH) Passive Optical Network (PON).

The implementations illustrated in FIGS. 13 and 14 extend the optical coupling to ICs to optical wavelength multiplexing and demultiplexing. Specific market applications of this DEMUX SMOC optical coupling to IC configurations include:

1) Passive Optical Network (PON) of Fiber-To-The-Home (FTTH) and GigaBit Ethernet GPON applications. In FTTH PON applications a "triplexer" transponder couples 1310 nm transmission light into a single mode fiber (SMF) from which 2 wavelengths of 1490 nm and 1550 nm carry data and video signals for transponder reception. Optical isolation between these three wavelengths determines transponder optoelectronic packaging configurations.
2) Coarse Wavelength Division Multiplexed (CWDM) transponders for Local Area Networks (LAN). Typically, 4 wavelengths at 20 nm separation are multiplexed from a 4×1 VCSEL array for transmission and demultiplexed using cascaded thin film filters to a 4×1 PIN photodetector array in a plastic injection molded package.
3) High data rate transponders for computer server communication between blades and boards. This emerging market requires scaleable low cost integrated transponders.

As mentioned above, the SMOC shown in FIG. 5 was optimized for injection molding fabrication. By using a diffraction grating as the 45° turning mirror, this structure can be easily adapted for multiplexed applications. FIG. 13 shows as a free-space schematic representation that employs a diffraction grating 700 to achieve optical multiplexing. Diffraction grating 700 spatially separates optical wavelengths at different diffracted angles. The different wavelengths all pass through the same SMOC pseudo-collimating lens 24 and the IC back-side silicon focusing lens 20. Each wavelength comes to focus at a different x-y location within the same SiGe waveguide plane within IC 10. In this example, wavelength 1 focuses at one location in the waveguide plane and a different wavelength 2 focuses at a different location in the waveguide plane. Two 45° turning mirrors 702(a) and 702(b), each at a corresponding one of the two locations at which the two wavelengths, couple each wavelength into different corresponding one of two SiGe wave guides 704(a) and 704(b).

Optical isolation is achieved by the spatial separation of the focused wavelengths at each SiGe waveguide. In the described embodiment, the wavelengths are in the range of about 1280-1300 nm and the SiGe waveguides have sizes that are in the range of about 1.5-3 mm with Si cladding (n=3.51) with a delta refractive index of 0.02. The waveguides are separated beyond the light's evanescent field. For a waveguide separation of 10 mm, this corresponds to a separation angle between the diffraction grating and SMOC lens of approximately arctan (10/500)=1.1° for a 500 mm thick silicon IC. Note that the SMOC lens and Si lens apertures can be made large enough to accommodate the range of wavelength multiplexing of the market applications.

The grating is optimized to diffract a diverging beam from a single mode fiber (SMF), with a numerical aperture NA=0.14, at 45° to diffract the beam efficiently 90° with a few degrees variation in diffraction angle depending upon wavelength and separation distance of SiGe waveguides for the given optical design.

The diffraction grating may be either inserted into the SMOC turning lens cavity as a separate piece or integrated into the SMOC injection molding process.

If the former approach is taken, a diffraction grating formed on glass is diced into a small, 0.5 mm by 0.5 mm (or smaller) chip with the edge angles clocked to the orientation of the grating. The grating chip is bonded to the plastic turning mirror surface and oriented passively to the edge of a recess pocket of the turning mirror. An index-matched epoxy is used for bonding the grating chip to the SMOC turning mirror. This method would be used, for example, for integrating diffraction gratings into silicon micromachined SMOCs.

The alternative method of fabricating the diffraction grating is by incorporating a diffraction grating structure into the turning mirror surface of the injection molding die mirror insert pin. This method has been commonly used to form diffraction gratings in plastic molded parts for visible light. The diffraction grating structure is typically formed in glass and incorporated into the injection-molding die. The SMOC turning mirror is then metallized with gold by sputter deposition processing. Sputter deposition of gold improves the diffraction grating efficiency. This approach has the advantage of resulting in a lower cost of integration.

Introducing the diffraction grating for wavelength multiplexing introduces a rotational alignment requirement of the SMOC relative to the IC. The SMOC pick'n'place interface of the ball end actuator and die bond collet configurations are designed to accommodate this requirement. It should be noted that active optical alignment of the SMOC to the IC now requires multiple optical couplings to be monitored. Optical design of the SMOC multiplexer can be such as to only require two optical channel monitors by symmetric design.

FIG. 14 shows a schematic SMOC multiplexer configuration for application for a Fiber-To-The-Home (FTTH) Passive Optical Network (PON). It supports bidirectional signaling. There are two downstream optical signals delivered by an optical fiber 744, one at wavelength of 1490 nm and the other at a wavelength of 1550 nm, and there is one upstream signal at a wavelength of 1310 nm. The two downstream optical signals diffract off of diffraction grating 700 into angles that are dependent on their wavelengths. Both diffracted optical signals pass through pseudo-collimating lens 24 and the resulting "collimated" beams are delivered to focusing lens 20 on the backside of IC chip 10. Focusing lens 20 focuses the collimated beams onto two different locations in the plane in which two optical waveguides 714(a) and 714(b) are fabricated. The optical signal at the 1550 nm wavelength is focused onto a first turning mirror 712(a) that reflects the optical signal into optical waveguide 714(a) and the optical signal at the 1490 nm wavelength is focused onto a second turning mirror 712(b) that reflects the optical signal into optical waveguide 714(b). There are two optical detectors 716(a) and 716(b) each of which is aligned in or with a corresponding different one of the optical waveguides 714(a) and 714(b).

The upstream optical signal is delivered to the IC chip via another optical fiber 746. It is coupled into an optical waveguide 750 in the IC chip in the manner previously described and illustrated in FIG. 1 (including a 45° turning mirror 760, a "pseudo" collimating lens 724, a focusing lens 720, and another 45° turning mirror 762). The upstream optical signal circuit also optionally includes a Si or SiGe based modulator in optical waveguide 750. The upstream signal is multiplexed into PON fiber 744 via mirror 712c, lens 20, lens 24 and diffraction grating 700.

The same type of configuration apples to CDWM applications where four downstream optical signals are wavelength demultiplexed to four waveguides and four photodetectors. Four wavelengths are coupled from external light sources through the IC output SMOC. Transmission optical signals may be multiplexed onto a single optical fiber at the output SMOC diffraction grating, or into a single waveguide by SiGe waveguide directional couplers, or multiplexed external to the IC prior to coupling into the IC waveguides. Configurations for high-data-rate server transponders are the same as for CDWM configurations with more emphasis on higher level of integration in the IC chip and integration of external light sources onto the chip.

Note that light sources may be integrated into the SMOC configurations for reduced cost by the following options which were detailed above:

1) Light sources may be integrated into silicon micromachined SMOCs.
2) Arrayed light sources such as arrayed VCSELs may be integrated in silicon micromachined SMOCs.
3) "Zero-level packaged" light sources in SMOC optical configuration as a single light source or as an array of light sources.

Other embodiments are within the following claims. For example, the various materials and features can be combined in different ways to produce different devices and structures. All such different combinations are within the scope of the following claims. In addition, though the lens in the SMOC has been described as a collimating lens or substantially collimating lens, there are advantages associated with making this lens produce a non-collimated beam (e.g. a diverging or converging beam). A non-collimated beam allows for lateral tilt and position errors closer to the focus of the waveguide or fiber to be more easily compensated by small movements of this lens. Furthermore, the optical coupling solution described herein is equally valid, and perhaps even more commercially valuable, for coupling of semiconductor laser waveguide light into an optical fiber. In that case, the IC chip would be a semiconductor substrate that includes a laser light source which delivers light via an optical waveguide to a turning mirror (or diffraction grating) that redirects that light up through lens 20 and lens 24 and into an optical fiber via another turning mirror (or diffraction grating).

What is claimed is:

1. An optoelectronic circuit comprising:
   an IC chip comprising a substrate in which an optical transmission pathway and a beam redirecting element have been fabricated, said substrate having a first lens formed thereon, wherein said beam redirecting element is aligned with the optical transmission pathway and the first lens is aligned with the beam redirecting element to form an optical path connecting the first lens, the beam redirecting element, and the optical transmission pathway; and
   an optical coupler including a second lens, said optical coupler affixed to the substrate and positioned to align the second lens with the first lens so as to couple an optical signal into or out of the optical transmission pathway within the IC chip, wherein the second lens is an integrally formed part of the optical coupler and wherein the optical coupler including the integrally formed second lens is made of a molded plastic.

2. The optoelectronic circuit of claim 1, wherein the substrate also includes microelectronic circuitry fabricated therein.

3. The optoelectronic circuit of claim 2, wherein the optical coupler is made of a material that is transparent to the wavelengths of the optical signal.

4. The optoelectronic circuit of claim 3, wherein the second lens is an integrally formed part of the optical coupler.

5. The optoelectronic circuit of claim 1, wherein the microelectronic circuitry is fabricated in a first layer in the substrate and the optical transmission pathway and the beam redirecting element are fabricated in a second layer within the substrate that is below the first layer.

6. The optoelectronic circuit of claim 1, wherein the substrate has a backside and the first lens is formed on the backside of the substrate.

7. The optoelectronic circuit of claim 6, wherein the optical coupler is affixed to the backside of the substrate.

8. The optoelectronic circuit of claim 6, wherein the optical coupler is affixed to the front side of the substrate.

9. The optoelectronic circuit of claim 1, wherein the first lens is formed on the front side of the substrate.

10. The optoelectronic circuit of claim 9, wherein the IC chip further includes a reflecting area formed on the backside of the substrate and wherein the first lens, the reflecting area, and the beam redirecting element in the optical transmission pathway are aligned along said optical path with the reflecting surface between the first lens and the beam redirecting element.

11. The optoelectronic circuit of claim 1, further comprising an optical fiber connected to the optical coupler, wherein said optical coupler, the first lens on the backside of the substrate and the beam redirecting element in combination optically couples the optical fiber and the optical transmission pathway.

12. An optoelectronic circuit comprising:
    an IC chip comprising a substrate in which an optical transmission pathway and a beam redirecting element have been fabricated, said substrate having a first lens formed thereon, wherein said beam redirecting element is aligned with the optical transmission pathway and the first lens is aligned with the beam redirecting element to form an optical path connecting the first lens, the beam redirecting element, and the optical transmission pathway; and
    an optical coupler including a second lens, said optical coupler affixed to the substrate and positioned to align the second lens with the first lens so as to couple an optical signal into or out of the optical transmission pathway within the IC chip,
    wherein the first and second lenses define an optical axis, wherein the optical coupler includes a beam redirecting element and a coupling surface against which the optical fiber is abutted, and wherein the optical fiber is aligned transversely to the optical axis.

13. The optoelectronic circuit of claim 1, wherein the coupler includes a diffraction grating which during operation redirects the optical signal.

14. The optoelectronic circuit of claim 1, wherein the coupler includes an angled surface and a metal film deposited on the angled surface to form the beam redirecting element in the optical coupler.

15. The optoelectronic circuit of claim 1, wherein the optical coupler includes a mounting structure.

16. An optoelectronic circuit comprising:
an IC chip comprising a substrate in which an optical transmission pathway and a beam redirecting element have been fabricated, said substrate having a first lens formed thereon, wherein said beam redirecting element is aligned with the optical transmission pathway and the first lens is aligned with the beam redirecting element to form an optical path connecting the first lens, the beam redirecting element, and the optical transmission pathway; and
an optical coupler including a second lens, said optical coupler affixed to the substrate and positioned to align the second lens with the first lens so as to couple an optical signal into or out of the optical transmission pathway within the IC chip, wherein the optical coupler includes a mounting structure and wherein the mounting structure comprises a tube-shaped extension which surrounds and extends away from the second lens in the optical coupler and defines at its distal end a flat surface which rests against the backside of the IC chip.

17. The optoelectronic circuit of claim 1, wherein the optical coupler including the integrally formed second lens is made of a molded glass.

18. The optoelectronic circuit of claim 1, wherein the optical coupler including the integrally formed second lens is made of a molded plastic.

19. The optoelectronic circuit of claim 1, further comprising an epoxy bonding the optical coupler to the substrate.

20. The optoelectronic circuit of claim 1, further comprising a metallization bonding the optical coupler to the substrate.

21. The optoelectronic circuit of claim 1, wherein the substrate comprises silicon.

22. An optoelectronic circuit comprising:
an IC chip comprising a substrate in which an optical transmission pathway and a beam redirecting element have been fabricated, said substrate having a first lens formed thereon, wherein said beam redirecting element is aligned with the optical transmission pathway and the first lens is aligned with the beam redirecting element to form an optical path connecting the first lens, the beam redirecting element, and the optical transmission pathway; and
an optical coupler including a second lens, said optical coupler affixed to the substrate and positioned to align the second lens with the first lens so as to couple an optical signal into or out of the optical transmission pathway within the IC chip, wherein the substrate further includes a pedestal extending away from the backside with the first lens formed on a distal end of the pedestal.

23. An The optoelectronic circuit of claim 1, further comprising:
an IC chip comprising a substrate in which an optical transmission pathway and a beam redirecting element have been fabricated, said substrate having a first lens formed thereon, wherein said beam redirecting element is aligned with the optical transmission pathway and the first lens is aligned with the beam redirecting element to form an optical path connecting the first lens, the beam redirecting element, and the optical transmission pathway;
an optical coupler including a second lens, said optical coupler affixed to the substrate and positioned to align the second lens with the first lens so as to couple an optical signal into or out of the optical transmission pathway within the IC chip; and
a chip carrier with the IC chip flip-chip mounted on the chip carrier.

24. The optoelectronic circuit of claim 1, further comprising an AR film deposited on the second lens in the optical coupler.

25. The optoelectronic circuit of claim 1, further comprising an AR film deposited on the first lens.

26. The optoelectronic circuit of claim 12, wherein the optical coupler includes a cylindrically-shaped extension with the coupling surface at one end of the cylindrically-shaped extension.

27. The optoelectronic circuit of claim 26, wherein the optical fiber is fusion spliced onto the coupling surface.

28. The optoelectronic circuit of claim 1, wherein the first lens is formed by etching the substrate.

29. The optoelectronic circuit of claim 12, wherein the beam redirecting element is oriented at an angle of about 45° relative to the optical axis.

30. The optoelectronic circuit of claim 1, wherein the first lens is a focusing lens which is positioned to focus a received collimated beam into the optical transmission pathway.

31. The optoelectronic circuit of claim 1, wherein the first lens is a focusing lens which is positioned to focus a received non-collimated beam into the optical transmission pathway.

32. The optoelectronic circuit of claim 30, wherein the second lens is a collimating lens which collimates a received beam and delivers the collimated beam to the first lens.

33. The optoelectronic circuit of claim 1, wherein the optical coupler includes an integrated light source.

34. The optoelectronic circuit of claim 33, wherein the light source comprises a laser which generates the optical signal, a turning beam redirecting element which redirects the optical signal from the laser into the second lens.

35. The optoelectronic circuit of claim 1, further comprising a light source mounted on the optical coupler, wherein during operation the light source generates the optical signal.

36. An optoelectronic circuit comprising:
an IC chip comprising a substrate in which an array of optical transmission pathways and an array of beam redirecting elements have been fabricated, said substrate having a first lens system formed thereon, wherein each beam redirecting element of the array of beam redirecting elements is aligned with a corresponding different optical transmission pathway of the array of optical transmission pathways and the first lens system is aligned with the array of beam redirecting elements to form an array of optical paths connecting the first lens system, the array of beam redirecting elements, and the array of optical waveguides; and
an optical coupler including a second lens system, said optical coupler affixed to the substrate and positioned to align the second lens system with the first lens system so as to couple optical signals into or out of the array of optical waveguides within the IC chip, wherein the second lens system is an integrally formed part of the optical coupler and the optical coupler including the integrally formed second lens system is made of a molded plastic.

37. The optoelectronic circuit of claim 36, wherein the first lens system is a first array of lens elements and the second lens system is a second array of lens elements.

38. The optoelectronic circuit of claim 37, wherein each lens element of the first array of lens elements is aligned with a corresponding different lens element of the second array of lens elements.

39. The optoelectronic circuit of claim 37, wherein the second array of lens elements is an integrally formed part of the optical coupler.

40. The optoelectronic circuit of claim 37, wherein the substrate has a backside and the first array of lens elements is formed on the backside of the substrate.

41. The optoelectronic circuit of claim 37, wherein the optical coupler is affixed to the backside of the substrate.

42. The optoelectronic circuit of claim 37, wherein each lens elements of the first array of lens elements is a focusing lens which is positioned to focus a received collimated beam into the optical waveguide.

43. The optoelectronic circuit of claim 42, wherein each lens elements of the second array of lens elements is a collimating lens which collimates a received beam and delivers the collimated beam to a corresponding lens element of the first array of lens elements.

44. The optoelectronic circuit of claim 1, wherein the optical transmission pathway is an optical waveguide.

45. The optoelectronic circuit of claim 44, wherein the beam redirecting element is a mirror.

46. The optoelectronic circuit of claim 12, wherein the optical transmission pathway is an optical waveguide.

47. The optoelectronic circuit of claim 46, wherein the beam redirecting element is a mirror.

48. The optoelectronic circuit of claim 16, wherein the optical transmission pathway is an optical waveguide.

49. The optoelectronic circuit of claim 48, wherein the beam redirecting element is a mirror.

50. The optoelectronic circuit of claim 22, wherein the optical transmission pathway is an optical waveguide.

51. The optoelectronic circuit of claim 50, wherein the beam redirecting element is a mirror.

52. The optoelectronic circuit of claim 36, wherein the optical transmission pathways are optical waveguides.

53. The optoelectronic circuit of claim 52, wherein the beam redirecting elements are mirrors.

* * * * *